US012677316B2

(12) United States Patent
Kutz et al.

(10) Patent No.: US 12,677,316 B2
(45) Date of Patent: Jul. 7, 2026

(54) RULES FOR RESOLVING CHANNEL AWARE TONE RESERVATION CONTENTION

(71) Applicant: QUALCOMM Incorporated, San Diego, CA (US)

(72) Inventors: Gideon Shlomo Kutz, Ramat Hasharon (IL); Idan Michael Horn, Hod Hasharon (IL); Lior Uziel, Hod Hasharon (IL); Oren Matsrafi, Yad Modechai (IL)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/354,993

(22) Filed: Jul. 19, 2023

(65) Prior Publication Data

US 2025/0031243 A1 Jan. 23, 2025

(51) Int. Cl.
| | |
|---|---|
| *H04W 74/0808* | (2024.01) |
| *H04W 28/26* | (2009.01) |
| *H04W 72/0446* | (2023.01) |
| *H04W 72/0453* | (2023.01) |
| *H04W 72/23* | (2023.01) |

(52) U.S. Cl.
CPC ....... *H04W 74/0808* (2013.01); *H04W 28/26* (2013.01); *H04W 72/0446* (2013.01); *H04W 72/0453* (2013.01); *H04W 72/23* (2023.01)

(58) Field of Classification Search
CPC . H04W 74/0808; H04W 72/23; H04W 28/26; H04W 72/0446; H04W 72/0453
See application file for complete search history.

(56) References Cited

U.S. PATENT DOCUMENTS

| | | | | |
|---|---|---|---|---|
| 2007/0071120 A1* | 3/2007 | Talwar | ............... | H04L 27/2614 |
| | | | | 375/260 |
| 2008/0298490 A1* | 12/2008 | Yun | ........................ | H04L 5/0048 |
| | | | | 375/260 |
| 2016/0365996 A1* | 12/2016 | Oh | ....................... | H04L 27/2628 |
| 2022/0070039 A1* | 3/2022 | Ly | ........................ | H04L 27/2607 |
| 2023/0327934 A1* | 10/2023 | El Hamss | ........... | H04W 52/365 |
| | | | | 370/329 |

* cited by examiner

*Primary Examiner* — Siren Wei
(74) *Attorney, Agent, or Firm* — QUALCOMM Incorporated

(57) ABSTRACT

Methods, systems, and devices for wireless communications are described. A user equipment (UE) may receive, from a network entity, control information indicating a first set of resource elements (REs) allocated for a tone reservation signal based on a channel frequency response. The UE and the network entity may determine a second set of REs for the tone reservation signal on the first set of REs and application of a rule. The rule may pertain to contention resolution between REs allocated for tone reservation signaling and REs allocated to a channel used for downlink signaling. The UE may receive both the tone reservation signal and a downlink signal, where the tone reservation signal is received in accordance with the second set of REs.

29 Claims, 16 Drawing Sheets

First Control Message 220

Second Control Message 230

Message 235

225

Contention Rule

205

Network Entity

235

230

220

225

Contention Rule

210

215

240

245

250

First Control Message 220

Second Control Message 230

Message 235

200

Reserved REs 310

Tone Reservation REs 315

Frequency

300

130

105

115

Network
Entity

Transceiver

1210

Antenna

1215

Communications
Manager

1220

Memory

Code

1230

1225

1240

Processor

1235

1205

1200

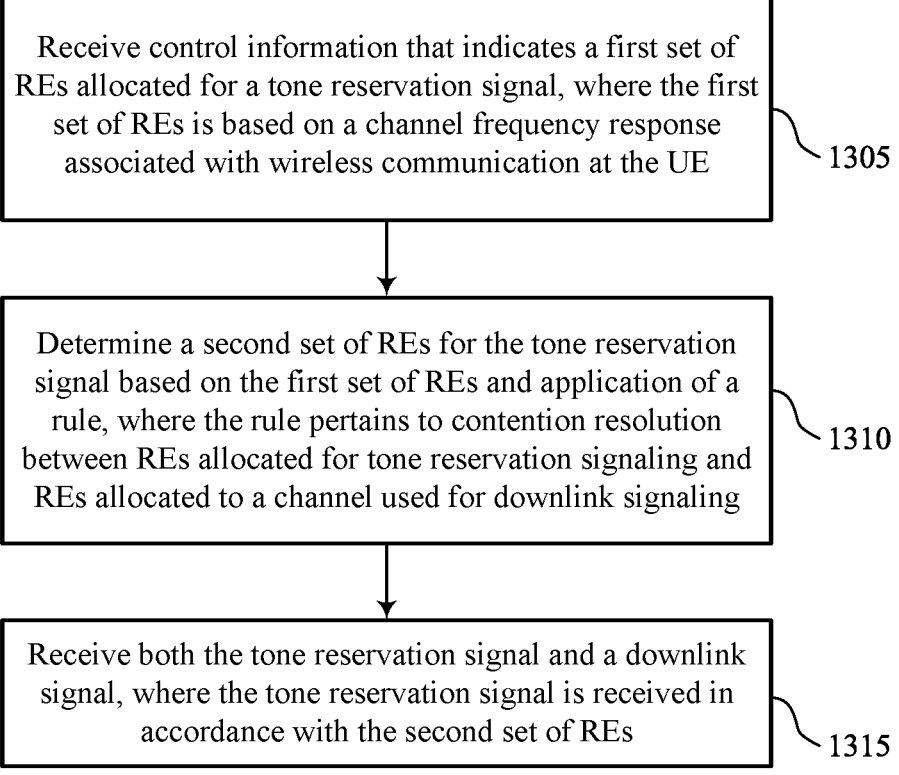

Receive control information that indicates a first set of REs allocated for a tone reservation signal, where the first set of REs is based on a channel frequency response associated with wireless communication at the UE

1305

Determine a second set of REs for the tone reservation signal based on the first set of REs and application of a rule, where the rule pertains to contention resolution between REs allocated for tone reservation signaling and REs allocated to a channel used for downlink signaling

1310

Receive both the tone reservation signal and a downlink signal, where the tone reservation signal is received in accordance with the second set of REs

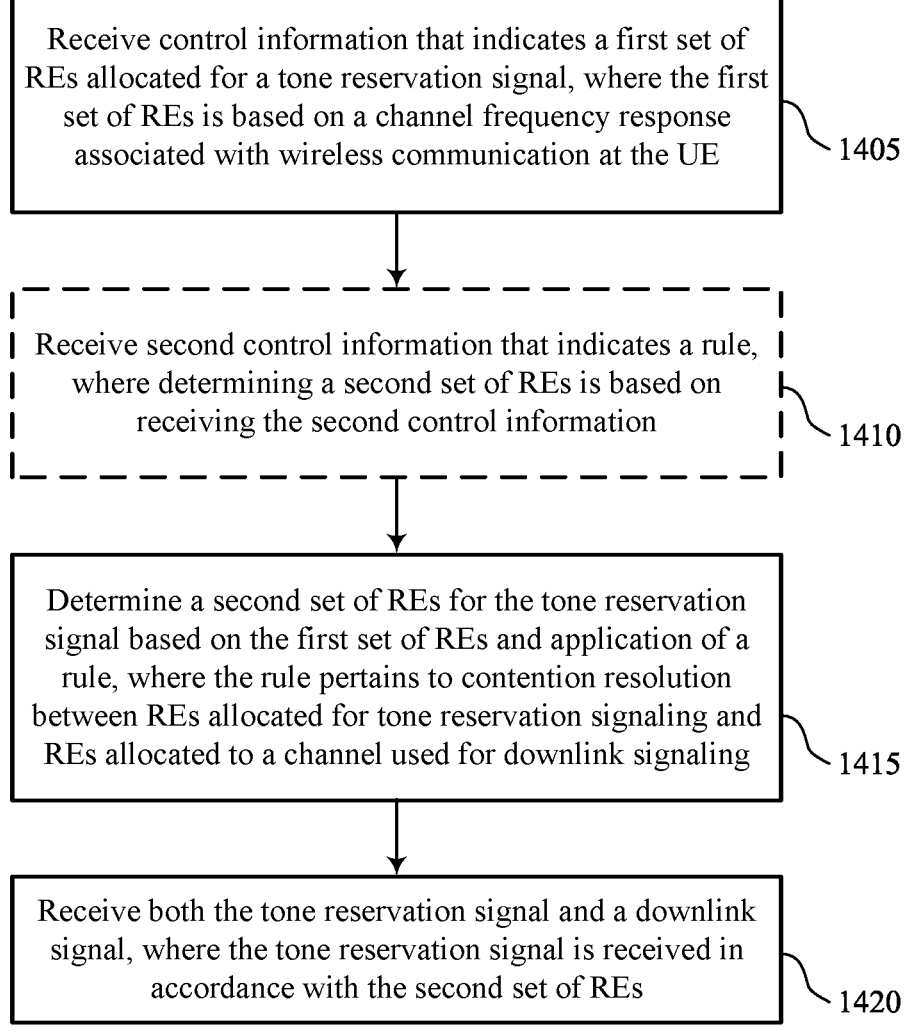

Receive control information that indicates a first set of REs allocated for a tone reservation signal, where the first set of REs is based on a channel frequency response associated with wireless communication at the UE

1405

Receive second control information that indicates a rule, where determining a second set of REs is based on receiving the second control information

1410

Determine a second set of REs for the tone reservation signal based on the first set of REs and application of a rule, where the rule pertains to contention resolution between REs allocated for tone reservation signaling and REs allocated to a channel used for downlink signaling

1415

Receive both the tone reservation signal and a downlink signal, where the tone reservation signal is received in accordance with the second set of REs

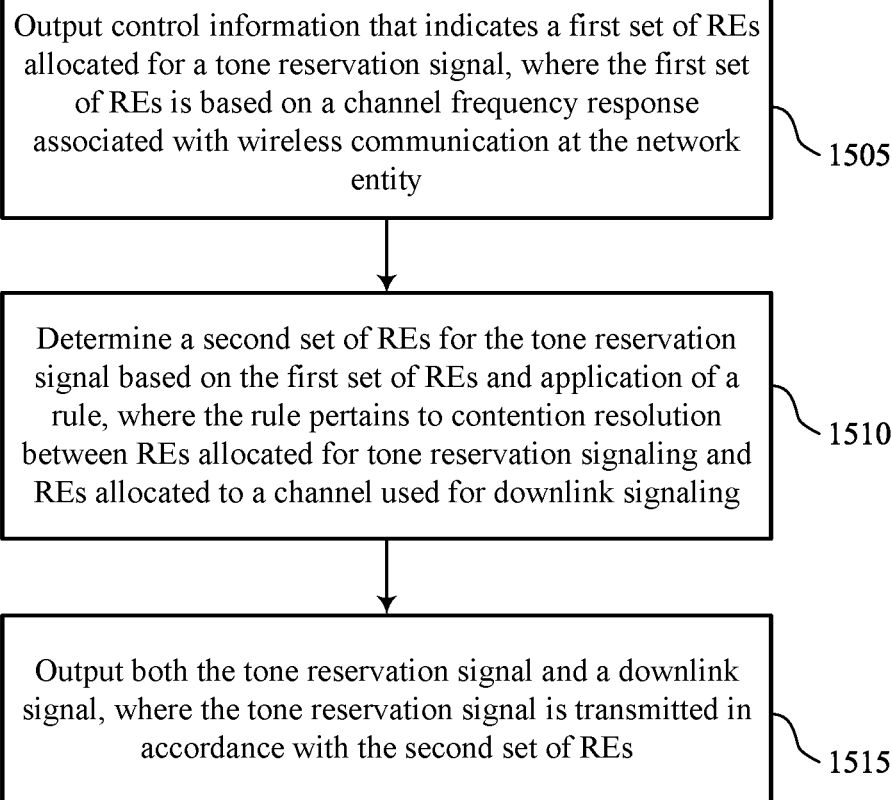

Output control information that indicates a first set of REs allocated for a tone reservation signal, where the first set of REs is based on a channel frequency response associated with wireless communication at the network entity

1505

Determine a second set of REs for the tone reservation signal based on the first set of REs and application of a rule, where the rule pertains to contention resolution between REs allocated for tone reservation signaling and REs allocated to a channel used for downlink signaling

1510

Output both the tone reservation signal and a downlink signal, where the tone reservation signal is transmitted in accordance with the second set of REs

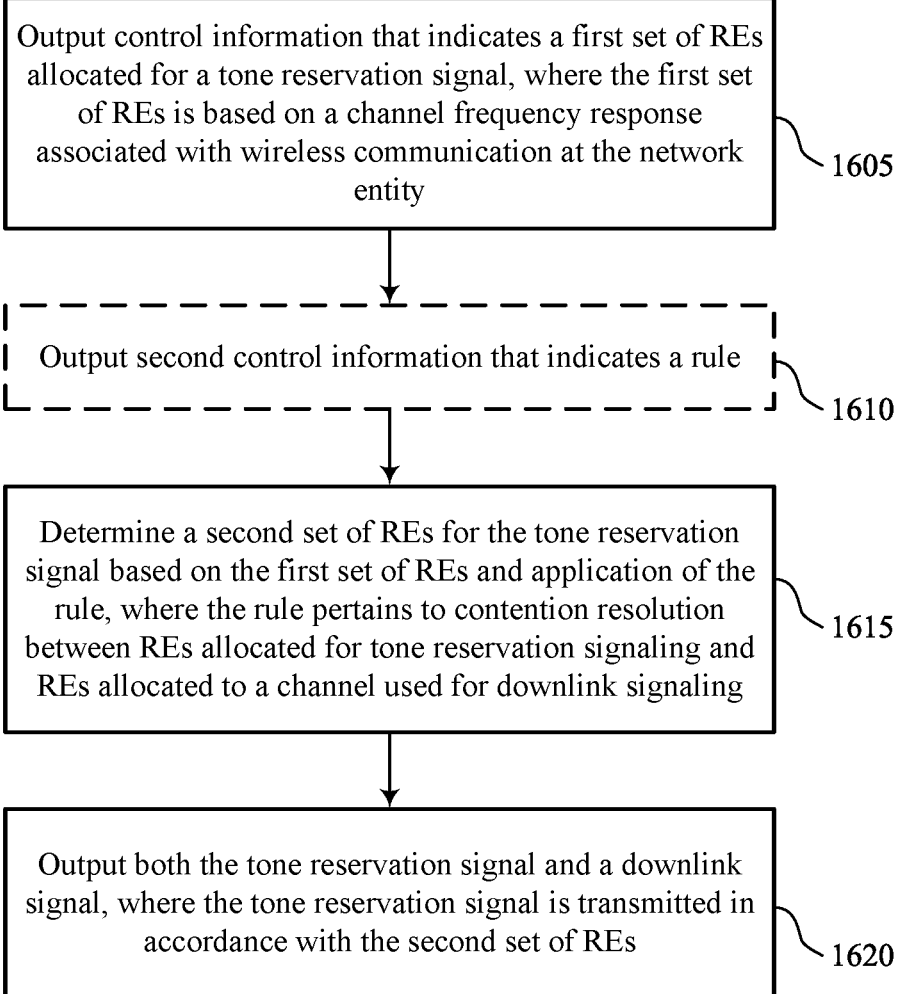

Output control information that indicates a first set of REs allocated for a tone reservation signal, where the first set of REs is based on a channel frequency response associated with wireless communication at the network entity ⟍ 1605

Output second control information that indicates a rule ⟍ 1610

Determine a second set of REs for the tone reservation signal based on the first set of REs and application of the rule, where the rule pertains to contention resolution between REs allocated for tone reservation signaling and REs allocated to a channel used for downlink signaling ⟍ 1615

Output both the tone reservation signal and a downlink signal, where the tone reservation signal is transmitted in accordance with the second set of REs ⟍ 1620

RULES FOR RESOLVING CHANNEL AWARE TONE RESERVATION CONTENTION

FIELD OF TECHNOLOGY

The following relates to wireless communications, including rules for resolving channel aware tone reservation contention.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support rules for resolving channel aware tone reservation (CATR) contention. For example, the described techniques enable a wireless communications system to resolve contention between resource elements (REs) allocated for tone reservation signaling and REs allocated to a channel used for downlink signaling. In some examples, a user equipment (UE) may receive an indication of a first set of REs allocated for one or more tone reservation signals. The UE may determine a second set of REs for the one or more tone reservation signals based on the first set of REs and applying a contention rule. In some examples, the contention rule may define procedures to handle contention of REs allocated for tone reservation signals and REs allocated to a channel used for downlink signaling. For example, the UE may determine the second set of REs based on determining that one or more of the REs of the first set contends with one or more other reserved REs. In such an example, the UE may receive a downlink signal in conjunction with the one or more tone reservation signals in accordance with the second set of REs.

A method for wireless communication by a UE is described. The method may include receiving control information that indicates a first set of REs allocated for a tone reservation signal, where the first set of REs is based on a channel frequency response associated with wireless communication at the UE, determining a second set of REs for the tone reservation signal based on the first set of REs and application of a rule, where the rule pertains to contention resolution between REs allocated for tone reservation signaling and REs allocated to a channel used for downlink signaling, and receiving both the tone reservation signal and a downlink signal, where the tone reservation signal is received in accordance with the second set of REs.

A UE for wireless communication is described. The UE may include one or more memories storing processor-executable code, and one or more processors coupled with the one or more memories. The one or more processors may be individually or collectively operable to execute the code to cause the UE to receive control information that indicates a first set of REs allocated for a tone reservation signal, where the first set of REs is based on a channel frequency response associated with wireless communication at the UE, determine a second set of REs for the tone reservation signal based on the first set of REs and application of a rule, where the rule pertains to contention resolution between REs allocated for tone reservation signaling and REs allocated to a channel used for downlink signaling, and receive both the tone reservation signal and a downlink signal, where the tone reservation signal is received in accordance with the second set of REs.

Another UE for wireless communication is described. The UE may include means for receiving control information that indicates a first set of REs allocated for a tone reservation signal, where the first set of REs is based on a channel frequency response associated with wireless communication at the UE, means for determining a second set of REs for the tone reservation signal based on the first set of REs and application of a rule, where the rule pertains to contention resolution between REs allocated for tone reservation signaling and REs allocated to a channel used for downlink signaling, and means for receiving both the tone reservation signal and a downlink signal, where the tone reservation signal is received in accordance with the second set of REs.

A non-transitory computer-readable medium storing code for wireless communication is described. The code may include instructions executable by one or more processors to receive control information that indicates a first set of REs allocated for a tone reservation signal, where the first set of REs is based on a channel frequency response associated with wireless communication at the UE, determine a second set of REs for the tone reservation signal based on the first set of REs and application of a rule, where the rule pertains to contention resolution between REs allocated for tone reservation signaling and REs allocated to a channel used for downlink signaling, and receive both the tone reservation signal and a downlink signal, where the tone reservation signal is received in accordance with the second set of REs.

In some examples of the method, UEs, and non-transitory computer-readable medium described herein, the rule includes that the second set of REs may be non-overlapping with a resource block and a slot that includes at least one RE allocated to the channel used for downlink control signaling.

In some examples of the method, UEs, and non-transitory computer-readable medium described herein, the rule includes a first rule that pertains to contention resolution within symbols allocated to a first channel used for downlink control signaling and a second channel used for downlink data signaling, and includes a second rule that pertains to contention resolution within symbols allocated to only the second channel used for downlink data signaling.

In some examples of the method, UEs, and non-transitory computer-readable medium described herein, the first set of REs includes a first subset of REs allocated for tone reservation signaling within one or more symbols allocated to the first channel and the second channel, and includes a second subset of REs allocated for tone reservation signaling within one or more symbols allocated to only the second channel.

In some examples of the method, UEs, and non-transitory computer-readable medium described herein, the first subset of REs include a first percentage of REs within the one or more symbols allocated to the first channel and the second channel, the second subset of REs include a second percentage of REs within the one or more symbols allocated to only the second channel, and the first percentage may be the same as the second percentage.

In some examples of the method, UEs, and non-transitory computer-readable medium described herein, the first rule includes that a respective location of REs allocated for tone reservation signaling within the symbols allocated to the first channel and the second channel may be based on a respective location of REs allocated for tone reservation signaling within the symbols allocated to only the second channel.

In some examples of the method, UEs, and non-transitory computer-readable medium described herein, the first rule further includes that the respective location of REs allocated for tone reservation signaling within the symbols allocated to the first channel and the second channel may be based on a minimum quantity of REs between a RE allocated for tone reservation signaling within the symbols allocated to only the second channel and a RE allocated for tone reservation signaling within the symbols allocated to the first channel and the second channel.

In some examples of the method, UEs, and non-transitory computer-readable medium described herein, the rule includes that REs in the first set of REs that overlap with one or more REs allocated to the channel used for downlink control signaling may be punctured.

In some examples of the method, UEs, and non-transitory computer-readable medium described herein, the rule for contention resolution may be based on a type of contention between the REs allocated for tone reservation signaling and the REs allocated to the channel used for downlink signaling.

In some examples of the method, UEs, and non-transitory computer-readable medium described herein, the type of contention includes a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

Some examples of the method, UEs, and non-transitory computer-readable medium described herein may further include operations, features, means, or instructions for receiving second control information that indicates a third set of REs used for rate matching associated with the channel used for downlink signaling and indicates a fourth set of REs used for rate matching associated with tone reservation signaling, where the rule includes that the second set of REs may be based on the third set of REs and the fourth set of REs. In some examples of the method, UEs, and non-transitory computer-readable medium described herein, the fourth set of REs includes a subset of the third set of REs.

Some examples of the method, UEs, and non-transitory computer-readable medium described herein may further include operations, features, means, or instructions for receiving second control information that indicates the rule, where determining the second set of REs may be based on receiving the second control information.

In some examples of the method, UEs, and non-transitory computer-readable medium described herein, receiving the second control information may include operations, features, means, or instructions for receiving a radio resource control (RRC) message, a medium access control-control element (MAC-CE), or downlink control information (DCI) including the second control information.

In some examples of the method, UEs, and non-transitory computer-readable medium described herein, determining the second set of REs may include operations, features, means, or instructions for determining the second set of REs based on application of the rule and a second rule that pertains to contention resolution between REs allocated for tone reservation signaling and REs allocated for transmission of downlink reference signals.

In some examples of the method, UEs, and non-transitory computer-readable medium described herein, the rule pertains to contention resolution between REs allocated for tone reservation signaling and reference signal REs.

In some examples of the method, UEs, and non-transitory computer-readable medium described herein, the REs allocated to the channel used for downlink signaling include REs within a physical downlink control channel (PDCCH) resource element group (REG), REs indicated via a physical resource block (PRB)-symbol bitmap, REs within a control resource set (CORESET), or resources allocated for transmission of downlink reference signal, or any combination thereof.

In some examples of the method, UEs, and non-transitory computer-readable medium described herein, the second set of REs may be different than the first set of REs based on the application of the rule.

A method for wireless communication by a network entity is described. The method may include outputting control information that indicates a first set of REs allocated for a tone reservation signal, where the first set of REs is based on a channel frequency response associated with wireless communication at the network entity, determining a second set of REs for the tone reservation signal based on the first set of REs and application of a rule, where the rule pertains to contention resolution between REs allocated for tone reservation signaling and REs allocated to a channel used for downlink signaling, and outputting both the tone reservation signal and a downlink signal, where the tone reservation signal is transmitted in accordance with the second set of REs.

A network entity for wireless communication is described. The network entity may include one or more memories storing processor-executable code, and one or more processors coupled with the one or more memories. The one or more processors may be individually or collectively operable to execute the code to cause the network entity to output control information that indicate a first set of REs allocated for a tone reservation signal, where the first set of REs is based on a channel frequency response associated with wireless communication at the network entity, determine a second set of REs for the tone reservation signal based on the first set of REs and application of a rule, where the rule pertains to contention resolution between REs allocated for tone reservation signaling and REs allocated to a channel used for downlink signaling, and output both the tone reservation signal and a downlink signal, where the tone reservation signal is transmitted in accordance with the second set of REs.

Another network entity for wireless communication is described. The network entity may include means for outputting control information that indicates a first set of REs allocated for a tone reservation signal, where the first set of REs is based on a channel frequency response associated with wireless communication at the network entity, means for determining a second set of REs for the tone reservation signal based on the first set of REs and application of a rule, where the rule pertains to contention resolution between REs allocated for tone reservation signaling and REs allocated to a channel used for downlink signaling, and means for outputting both the tone reservation signal and a downlink signal, where the tone reservation signal is transmitted in accordance with the second set of REs.

A non-transitory computer-readable medium storing code for wireless communication is described. The code may include instructions executable by one or more processors to output control information that indicate a first set of REs allocated for a tone reservation signal, where the first set of REs is based on a channel frequency response associated with wireless communication at the network entity, determine a second set of REs for the tone reservation signal based on the first set of REs and application of a rule, where the rule pertains to contention resolution between REs allocated for tone reservation signaling and REs allocated to a channel used for downlink signaling, and output both the tone reservation signal and a downlink signal, where the tone reservation signal is transmitted in accordance with the second set of REs.

In some examples of the method, network entities, and non-transitory computer-readable medium described herein, the rule includes that the second set of REs may be non-overlapping with a resource block and a slot that include at least one RE allocated to the channel used for downlink control signaling.

In some examples of the method, network entities, and non-transitory computer-readable medium described herein, the rule includes a first rule that pertains to contention resolution within symbols allocated to a first channel used for downlink control signaling and a second channel used for downlink data signaling, and includes a second rule that pertains to contention resolution within symbols allocated to only the second channel used for downlink data signaling.

In some examples of the method, network entities, and non-transitory computer-readable medium described herein, the first set of REs includes a first subset of REs allocated for tone reservation signaling within one or more symbols allocated to the first channel and the second channel, and includes a second subset of REs allocated for tone reservation signaling within one or more symbols allocated to only the second channel.

In some examples of the method, network entities, and non-transitory computer-readable medium described herein, the first subset of REs include a first percentage of REs within the one or more symbols allocated to the first channel and the second channel, the second subset of REs include a second percentage of REs within the one or more symbols allocated to only the second channel, and the first percentage may be the same as the second percentage.

In some examples of the method, network entities, and non-transitory computer-readable medium described herein, the first rule includes that a respective location of REs allocated for tone reservation signaling within the symbols allocated to the first channel and the second channel may be based on a respective location of REs allocated for tone reservation signaling within the symbols allocated to only the second channel.

In some examples of the method, network entities, and non-transitory computer-readable medium described herein, the first rule further includes that the respective location of REs allocated for tone reservation signaling within the symbols allocated to the first channel and the second channel may be based on a minimum quantity of REs between a RE allocated for tone reservation signaling within the symbols allocated to only the second channel and a RE allocated for tone reservation signaling within the symbols allocated to the first channel and the second channel.

In some examples of the method, network entities, and non-transitory computer-readable medium described herein, the rule includes that REs in the first set of REs that overlap with one or more REs allocated to the channel used for downlink control signaling may be punctured.

In some examples of the method, network entities, and non-transitory computer-readable medium described herein, the rule for contention resolution may be based on a type of contention between the REs allocated for tone reservation signaling and the REs allocated to the channel used for downlink signaling.

In some examples of the method, network entities, and non-transitory computer-readable medium described herein, the type of contention includes a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

Some examples of the method, network entities, and non-transitory computer-readable medium described herein may further include operations, features, means, or instructions for outputting second control information that indicates a third set of REs used for rate matching associated with the channel used for downlink signaling and indicates a fourth set of REs used for rate matching associated with tone reservation signaling, where the rule includes that the second set of REs may be based on the third set of REs and the fourth set of REs. In some examples of the method, network entities, and non-transitory computer-readable medium described herein, the fourth set of REs includes a subset of the third set of REs.

Some examples of the method, network entities, and non-transitory computer-readable medium described herein may further include operations, features, means, or instructions for outputting second control information that indicates the rule.

In some examples of the method, network entities, and non-transitory computer-readable medium described herein, outputting the second control information may include operations, features, means, or instructions for outputting an RRC message, a MAC-CE, or DCI including the second control information.

In some examples of the method, network entities, and non-transitory computer-readable medium described herein, determining the second set of REs may include operations, features, means, or instructions for determining the second set of REs based on application of the rule and a second rule that pertains to contention resolution between REs allocated for tone reservation signaling and REs allocated for transmission of downlink reference signals.

In some examples of the method, network entities, and non-transitory computer-readable medium described herein, the rule pertains to contention resolution between REs allocated for tone reservation signaling and reference signal REs.

In some examples of the method, network entities, and non-transitory computer-readable medium described herein, the REs allocated to the channel used for downlink signaling include REs within a PDCCH REG, REs indicated via a PRB-symbol bitmap, REs within a CORESET, or resources allocated for transmission of downlink reference signal, or any combination thereof.

In some examples of the method, network entities, and non-transitory computer-readable medium described herein, the second set of REs may be different than the first set of REs based on the application of the rule.

BRIEF DESCRIPTION OF THE DRAWINGS

FIGS. 13 through 16 show flowcharts illustrating methods that support rules for resolving CATR contention in accordance with one or more aspects of the present disclosure.

DETAILED DESCRIPTION

Figure 1:
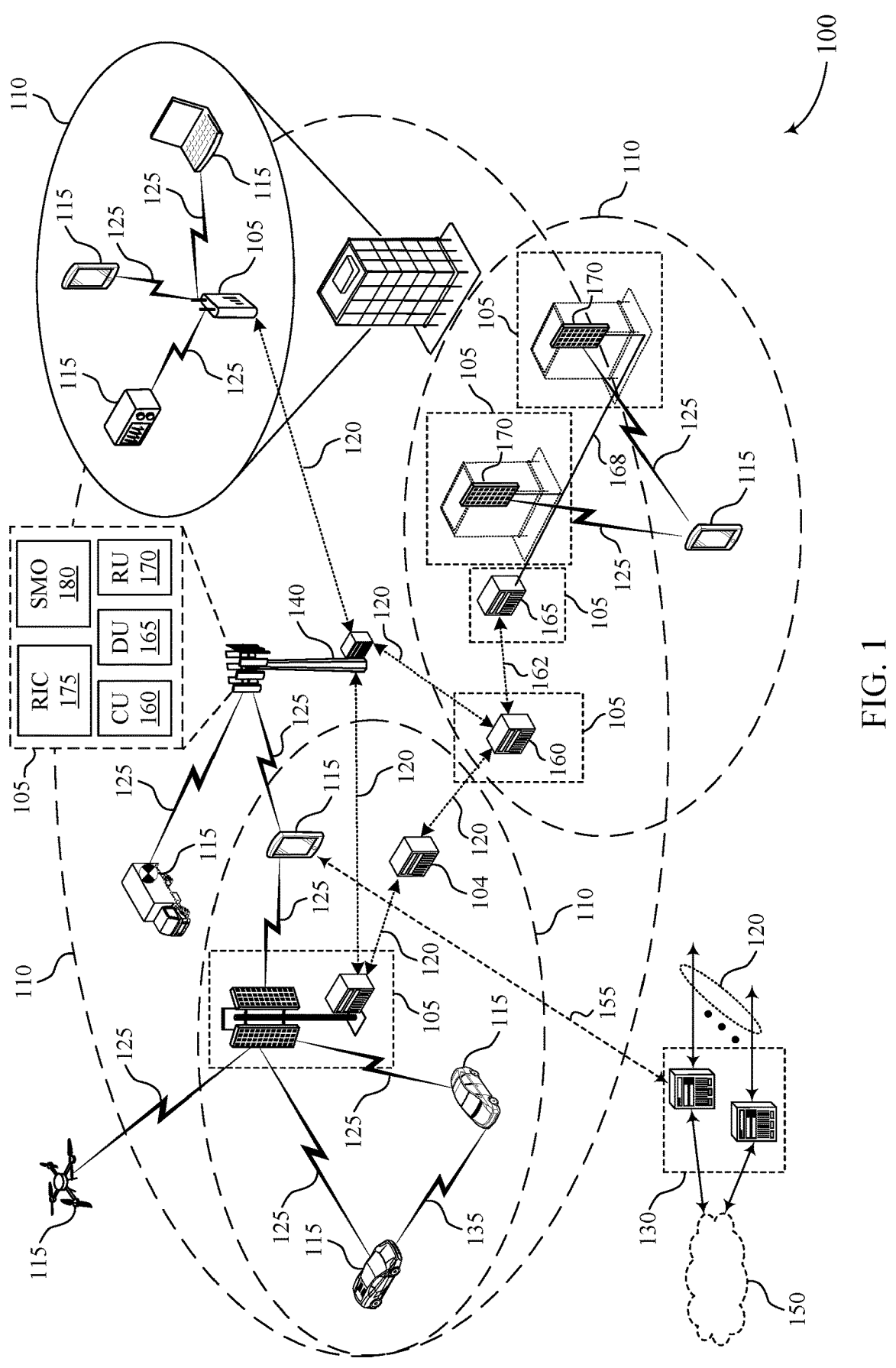
FIG. 1 shows an example of a wireless communications system that supports rules for resolving channel aware tone reservation (CATR) contention in accordance with one or more aspects of the present disclosure.

In some wireless communications systems, a network entity may utilize tone reservation techniques, in which the network entity may reserve resource elements (REs) for transmission of tone reservation signals (e.g., peak-canceling or peak-reduction signals). For instance, the network entity may use the reserved resources to transmit tone reservation signals with other downlink signals to lower a peak-to-average power ratio (PAPR) of the other downlink signals at a user equipment (UE). In some cases, the network entity may support channel aware tone reservations (CATRs), in which the network entity may dynamically select REs for one or more tone reservation signals based on a frequency response of a channel (e.g., an uplink channel, a downlink channel) between the network entity and the UE. In such cases, the network entity may indicate the selected REs to the UE, which may improve processing (e.g., decoding, demodulating) of the other downlink signals transmitted with the tone reservation signals.

In some cases, however, the frequency response of the channel may vary, for example, due to varying channel conditions. In such cases, the selected REs for CATR (e.g., a respective frequency location of the selected REs) may also change. In some instances, the respective frequency location of one or more selected REs may overlap with one or more other REs allocated for downlink communications. For instance, a selected RE may overlap with an RE allocated to a physical downlink control channel (PDCCH). That is, the selected RE may contend with the RE allocated to the PDCCH. In some examples, the UE may lack a mechanism for resolving contention between REs selected for CATR and other reserved REs (e.g., REs allocated to the PDCCH), which may lead to decreased reliability of wireless communications between the UE and the network entity.

Various aspects of the present disclosure generally relate to rules for resolving CATR contention and, more specifically, a framework for enabling a wireless communication device (e.g., a UE, a network entity) to resolve contention between REs allocated for tone reservation signaling and REs allocated to a channel used for downlink signaling. For example, in accordance with such rules, a UE and a network entity (e.g., or some other type of network device) may resolve contention between tone reservation signal REs (e.g., CATR REs) and other reserved REs. In some examples, the network entity may select, and indicate to a UE, a first set (e.g., an initial set) of REs for a tone reservation signal (e.g., CATR REs). The UE (and the network entity) may apply a rule to the first set of REs to determine a second set of REs to be used for transmitting (e.g., from the network entity) the tone reservation signal. Application of the rule may enable the UE (and the network entity) to resolve contention between CATR REs and reserved REs, such that the second set of REs may not overlap with REs previously allocated for downlink communications. The network entity may configure the UE with the rule (e.g., may indicate the rule to the UE, such as via control signaling), or the UE may be otherwise configured with the rule (e.g., the rule may be predefined at the UE).

In some examples, a reserved RE may be allocated in a resource block of a symbol. In such examples, the rule may define that CATR REs are not to be allocated in the RB during a slot that includes the symbol. In some other examples, the rule may define multiple (e.g., different) locations patterns for CATR REs based on different types of symbols. For example, a first pattern may define a location of CATR REs within symbols allocated for control signaling (e.g., signaling via a PDCCH) and data signaling (e.g., signaling via a physical downlink shared channel (PDSCH)) and a second pattern may define a location of CATR REs within symbols allocated to data signaling (e.g., only allocated to data signaling). In some examples, the rule may define that CATR REs that overlap with reserved REs are punctured. The UE may apply one or more rules based on a type of reserved RE that is overlapping with one or more CATR REs. In some examples, application of one or more rules, as described herein, may lead to increased data rates, increased spectral efficiency, and improved communication quality, among other benefits. Aspects of the disclosure are initially described in the context of wireless communications systems. Aspects of the disclosure are further illustrated by and described with reference to RE configurations, process flows, apparatus diagrams, system diagrams, and flowcharts that relate to rules for resolving channel aware tone reservation contention.

FIG. 1 shows an example of a wireless communications system 100 that supports rules for resolving channel aware tone reservation contention in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support rules for resolving channel aware tone reservation contention as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, a network entity 105 may reserve REs for transmission of one or more tone reservation signals (e.g., peak-canceling signals, peak-reduction signals, CATR signals) to lower a PAPR of one or more downlink signals at a UE 115. For instance, the UE 115 may receive a combined signal that includes a downlink signal and a CATR signal. In such an example, the CATR signal may constructively or destructively interfere with the downlink signal and reduce a PAPR (e.g., an overall PAPR) of the combined signal. In some cases, however, a location of the selected CATR REs may overlap with REs allocated for downlink communications (e.g., reserved REs), which may lead to ambiguity at the UE.

In accordance with one or more techniques described herein, a UE 115, a network entity 105, or some other network device, may resolve contention between CATR REs and other reserved REs based on one or more contention rules. The network entity 105 may indicate the contention rule to the UE 115, or the UE 115 may be otherwise configured with the contention rule (e.g., the contention rule may be predefined or preconfigured). For example, a UE 115 may receive an indication of a first set of REs for CATR and may apply the contention rule to determine a second set of REs that the UE 115 may use for reception of the CATR signals (e.g., that the network entity 105 may use for transmission of the CATR signals). The contention rule may be defined such that the second set of REs for CATR may not contend (e.g., overlap, collide) with other REs allocated for downlink communications. In some examples, the UE 115 may be configured with multiple (e.g., different) contention rules. In such examples, the UE 115 may apply one or more of the contention rules based on a type of reserved RE that is overlapping with CATR REs. That is, a contention rule applied by the UE 115 (and the network entity 105) may be based on the type of reserved RE that is overlapping with CATR REs. Application of one or more contention rules may enable the UE 115 (e.g., and the network entity 105) to improve communications, for example, in scenarios of overlapping REs. For instance, application of one or more contention rules may enable the network entity 105 to dynamically allocate CATR REs based on channel conditions while avoiding contention with other reserved REs, thereby increasing spectral efficiency, reducing ambiguity, and improving power reduction schemes.

Figure 2:
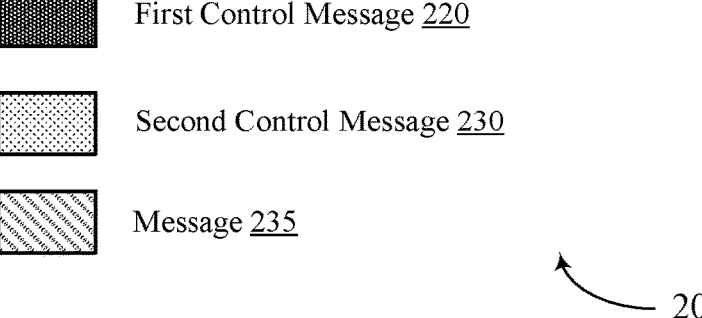
FIG. 2 shows an example of a wireless communications system that supports rules for resolving CATR contention in accordance with one or more aspects of the present disclosure.

FIG. 2 shows an example of a wireless communications system 200 that supports rules for resolving CATR contention in accordance with one or more aspects of the present disclosure. The wireless communications system 200 may implement or be implemented by aspects of the wireless communications system 100. For example, the wireless communications system 200 may include a network entity 205 and a UE 215, which may be examples of, or include, a network entity 105 and UE 115 described with reference to FIG. 1. Although a network entity 205 and a UE 215 are shown, the techniques herein may be applied by one or more other devices described herein, including with reference to FIG. 1. The network entity 205 may communicate with the UE 215 using a communication link 210. For example, the network entity 205 may transmit downlink signals, such as downlink control signals (e.g., PDCCH signals) or downlink data signals (e.g., PDSCH signals), to the UE 215 via the communication link 210. Additionally, or alternatively, the UE 215 may transmit uplink signals, such as uplink control signals (e.g., physical uplink control channel (PUCCH) signals) or uplink data signals (e.g., physical uplink shared channel (PUSCH) signals), to the network entity 205 via the communication link 210. In some examples, the network entity 205, the UE 215, or both, may apply one or more RE contention rules as described herein to improve efficiency of PAPR reduction procedures.

In some examples, one or more communication devices operating within the wireless communications system 200 (e.g., the network entity 205, the UE 215) may use an increased quantity of antennas (e.g., multiple antennas in which the antenna dimension is smaller) to support communications in relatively high frequency ranges (FRs), such as FR2, FR3, or FR4. Usage of the increased quantity of antennas may increase power consumption of the communications devices, for example, due to relatively high RF power consumption. Additionally, communicating in the relatively high frequency ranges may decrease a power efficiency of the communication devices (e.g., of one or more power amplifiers (PAs) of the communication devices). For instance, for FR2, FR3, and FR4 deployments, a relatively large quantity (e.g., number) of antennas may be used at a network entity (e.g., the network entity 205), which may lead to a decrease in power efficiency of a PA and an increase in power consumption at the network entity (e.g., relative to FRI deployments). In some examples, RF Power consumption at relatively high frequencies (e.g., frequencies included in FR2, FR3, or FR4) may be a bottleneck of one or more technologies. For example, decreased power efficiency (e.g., due to decreased power amplifier efficiency) may lead to a reduced communication quality in the wireless communications system 200 (e.g., due to signal degradation from noise or interference caused by increased power consumption). Thus, the wireless communications system 200 (e.g., the UE 215, the network entity 205) may support one or more power reduction schemes (e.g., to mitigate such adverse effects).

In some examples, the network entity 205 may support one or more power reduction schemes (e.g., a CATR PAPR reduction scheme) that include transmission of tone reservation signals. For example, the network entity 205 may support a tone reservation signal in which the network entity 205 may reserve an RE (e.g., a frequency location of an RE) for transmission of a tone reservation signal. In some examples, a frequency location of the RE reserved for tone reservation (e.g., the tone reservation signal) may be based on one or more frequency locations with a relatively low power (e.g., low power REs). For example, based on channel estimation at the UE 215 (e.g., channel estimation based on one or more downlink demodulation reference signals (DMRSs) or channel state information reference signals (CSI-RSs)) or channel estimation at the network entity 205 (e.g., channel estimation based on one or more sounding reference signals (SRSs) or one or more uplink DMRSs), the network entity 205 may determine one or more REs that may have a relatively low power and, as such, may reserve the one or more REs for one or more tone reservation signals. In other words, a determination of low power REs may be based on a DMRS or a CSI-RS channel estimation, or based on an estimation from the network entity 205 based on an SRS or a PUSCH DMRS, among other examples.

In some examples, a relatively low power RE of a channel may refer to a channel null or a frequency in which the channel has low energy or capacity relative to other frequencies of the channel. In some examples, REs used for tone reservation may be associated with a capacity loss, however, dynamically selecting low power REs for tone reservation may reduce the capacity loss. In other words, REs used for tone reservation may be selected dynamically based on the channel response such that the REs used for tone reservation may occupy relatively low power REs (e.g., one or more lowest power REs), which may reduce the capacity loss of the channel. As described herein, REs reserved for transmission of a tone reservation signal may be referred to as CATR REs. For example, a tone reservation signal (e.g., a PAPR reduction signal, a signal not including data, a signal not including information bits) may be transmitted on one or more CATR REs to reduce a PAPR (e.g., an overall PAPR) of a downlink transmission. In some examples, the selection of the RE for the tone reservation signal may change over time, for example, based on changes in the channel. In some examples, an indication of a tone reservation RE may be sent using side information (e.g., from a transmitter to a receiver). For example, the network entity 205 may transmit an indication of a tone reservation RE to the UE 215. Additionally, or alternatively, a tone reservation RE may be estimated at the UE 215. In some examples, CATRs, as discussed herein, may provide network energy savings.

In some examples, CATR REs (e.g., frequency domain locations having relatively low power REs) may contend (e.g., collide or overlap) with one or more REs reserved for downlink communications (e.g., REs reserved for transmission of signals other than tone reservation signals). For example, one or more CATR REs may contend with one or more other REs allocated to (e.g., reserved for) downlink signaling, such as downlink control channel signaling or downlink shared channel signaling. As described herein, an RE allocated to a channel for downlink signaling (e.g., downlink control channel signaling, downlink shared channel signaling, downlink reference signal signaling, or any combination thereof) may be referred to as a reserved RE. Some examples of reserved REs may include resource element groups (REGs) or physical resource blocks (PRBs) that may be allocated to one or more downlink channels, such as the PDCCH, the PDSCH, or both. For example, reserved REs may include one or more PDCCH REs, one or more REs in a PDCCH REG (e.g., a PDCCH REG of a scheduling downlink control information (DCI)), one or more PDCCH REGs, one or more PRB-symbol bitmap REs, one or more CORESET REs, or one or more other types of REs that may be allocated for transmission (or monitoring) of downlink control signals, downlink data signals, downlink reference signals, or any combination thereof.

In some examples, such as examples in which a precoder granularity is per-REG bundle, a DMRS transmitted via the PDCCH (e.g., a PDCCH-DMRS) may be included within one or more REGs of PDCCH data. In such examples, PDCCH REGs of the scheduling DCI may include a union of the PDCCH data and the associated PDCCH-DMRS. In some examples, the network entity 205 may use one or more PRB-symbol bitmaps to inform the UE 215 of one or more PRBs (e.g., which PRBs) that the UE 215 may rate match around (e.g., to indicate that the one or more PRBs may be dedicated for other transmissions, such as LTE transmissions). Such PRB-symbols bitmaps may be indicate per RB and per symbol. Accordingly, one or more symbols may have an associated PRB-symbol bitmap (e.g., and other symbols may not). In some cases, the network entity 205 may indicate, to the UE 215, to rate match around a CORESET (e.g., around an entire CORESET, not only around a scheduling DCI). For example, the network entity 205 may transmit an indication of whether the UE 215 may rate match around the scheduling DCI, or the CORESET, or both. In other words, the network entity 205 may configure the UE 215 (or the UE 215 may be otherwise configure) to rate match PDSCH transmissions around one or more REs (e.g., tones) allocated to the PDCCH, such as one or more PDCCH REGs of the scheduling DCI, one or more PRB-symbol bitmap(s), or one or more CORESETs, or any combination thereof. Accordingly, the one or more REs allocated to the PDCCH (e.g., and the one or more REs allocated for the PDSCH transmissions), may be referred to as reserved REs. In other words, types of reserved REs may include REs included in PDCCH REGs of the scheduling DCI, REs associated with one or more PRB-symbol bitmap(s), and REs included in one or more CORESETs, among other examples.

In some examples, the network entity 205 and the UE 215 may support one or more rules for handling contention between CATR REs and reserved REs (e.g., reserved REs that may include PDCCH REs, either for the UE 215 or for other UEs). For example, such contention may occur in symbols in which both a PDCCH search space and PDSCH are present. For example, the PDSCH may be rate-matched around the PDCCH and, if the CATR REs are located in those tones (e.g., the PDSCH tones or the PDCCH tones), the network entity 205 and the UE 215 may apply the one or more contention rules for resolving (e.g., handling) the contention. That is, reserved REs may include REs reserved for downlink communications with the UE 215, or one or more other UEs, or any combination thereof. That is, in some examples, reserved REs may refer to REs reserved for the UE 215 or one or more other UEs (not shown) that may operate in the wireless communications system 200 (or another wireless communications system). In some cases, contention between REs reserved for tone reservation (e.g., CATR REs) and reserved REs may occur in one or more symbols in which both a PDCCH search space and a PDSCH may be present. In such cases, the UE 215 may rate match data signaling (e.g., PDSCH signaling) around the tones (e.g., frequencies, subcarriers) of the reserved REs. However, CATR REs allocated in the same tones as the reserved REs (e.g., if CATR REs include a same one or more frequencies as the reserved REs) may lead to ambiguity, at the UE 215, in determining how to process (e.g., handle, manage) both the CATR REs and the reserved REs. Additionally, overlap (e.g., a collision) between the CATR REs and the reserved REs (e.g., signaling transmitted via the CATR REs and the reserved REs) may lead to degradation of channel estimation or increased complexity for channel estimation functionality at the UE 215. A tone reservation (e.g., CATR) may be used to reduce PAPR and an initial selection of REs for the tone reservation may be a null location of the channel.

As illustrated in the example of FIG. 2, the network entity 205 and the UE 215 may apply a contention rule 225 (e.g., a policy) to resolve contention between REs allocated for tone reservation signals (e.g., CATR REs) and REs allocated to a channel used for downlink signaling (e.g., reserved REs). Application of the contention rule 225 may improve CATR schemes in the wireless communications system 200, for example, by enabling the network entity 205 or the UE 215 (or both) to compensate for potential contention that may occur with reserved REs (e.g., as a result of the dynamically changing selection of CATR REs).

In some examples, the network entity 205 may transmit a first control message 220 to the UE 215. The first control message 220 may include control information that indicates a first set of REs allocated for one or more tone reservation signals (e.g., one or more CATR signals). The first set of REs may be an initial set of CATR REs allocated for (e.g., selected for) the one or more tone reservation signals. In some examples, a set of CATR REs may be referred to as a CATR RE pattern. The first (initial) set of CATR REs may be based on a channel frequency response associated with wireless communication at the UE 215. That is, the network entity 205 may select the first set of REs based on channel estimation performed at the UE 215 or the network entity 205. The UE 215 may determine a second set REs for the one or more tone reservation signals based on the first set of REs and application of the contention rule 225. For instance, the UE 215 may apply the contention rule 225 to the first set of REs indicated via the first control message 220. In some examples, the contention rule 225 may be configured (e.g., preconfigured, predefined) at the UE 215 and the network entity 205. That is, the network entity 205 and the UE 215 may be configured with a same contention rule (e.g., the contention rule 225). Additionally, or alternatively, the network entity 205 may transmit a second control message 230 which may include an indication of the contention rule 225 (e.g., the network entity 205 may configure the UE 215 with the contention rule 225) or other control information associated with the contention rule 225 (e.g., one or more other CATR RE patterns). For instance, the network entity 205 may indicate, to the UE 215, a policy associated with the contention rule 225 (e.g., side information transmitted to the UE 215 may be modified based on the contention rule 225) via the second control message 230. In some examples, the second control message 230 may include an RRC message, a MAC-CE message, a DCI message, or any combination thereof. For example, the network entity 205 may indicate (e.g., signal) the contention rule (or information indicative of the contention rule) to the UE via a flag as part of an RRC message, a MAC-CE, or DCI.

Based on applying the contention rule 225, the UE 215 may receive, from the network entity 205, a message 235 in accordance with the second set of REs (e.g., the set of REs determined at the UE 215 for one or more CATR signals). The message 235 may include a reduced PAPR signal 250 (e.g., may consume less power at a transmitter), which may be generated by the network entity 205. The reduced PAPR signal 250 may include a desired data signal portion 240 (e.g., a downlink data signal, a signal transmitted via a downlink data channel or a downlink control channel) and a tone reservation signal portion 245 (e.g., CATR signal). For example, the network entity 205 may combine the desired data signal portion 240 and the tone reservation signal portion 245 to generate a reduced PAPR signal 250 to be transmitted via the message 235. In some examples, the network entity 205 may initially allocate the first set of REs for the tone reservation signal portion 245. However, one or more of the REs included in the first set of REs may contend with one or more reserved REs. Accordingly, the network entity 205 may apply the contention rule 225 to identify the second set of REs and, accordingly, generate the reduced PAPR signal 250 for the message 235 using the tone reservation signal portion 245 in accordance with the second set of REs. Although reduced PAPR signal 250 is illustrated in the example of FIG. 2 as being generated at the network entity 205, in some other examples, the UE 215 may perform CATR and generate a reduced PAPR signal that includes a desired data signal portion (e.g., an uplink data signal, a signal transmitted via an uplink data channel or an uplink control channel) and a tone reservation signal portion.

In some examples, the contention rule 225 may include that network entity 205 does not allocate CATR REs on tones (e.g., frequencies) used for reserved REs in one or more symbols (e.g., any symbols) in a slot. For example, if one or more reserved REs are allocated in one or more resource blocks (RBs) for a first one, two, or three symbols of a slot, the CATR REs may not be allocated on the one or more RBs in the slot (e.g., in any of the symbols in the slot, including symbols that may not include reserved REs). That is, if a given slot includes at least one RE allocated for downlink control signaling (e.g., a reserved RE), the network entity 205 may not allocate one or more (e.g., any) CATR REs in the given slot. For example, if reserved REs are allocated in one or more RBs for a quantity of symbols of a slot (e.g., the first one, two, or three symbols) the CATR REs are not allocated (e.g., placed) on those RBs in the slot (e.g., in any of the symbols in the slot), including symbols that may not include reserved REs. In other words, the contention rule 225 may include that the second set of REs is non-overlapping with an RB and a slot that includes at least one RE allocated to the channel used for downlink control signaling (e.g., a reserved RE). In some examples, CATR side information may be modified such that reserved REs may be disregarded (e.g., may be modified to ignore or otherwise skip the reserved REs tones). In some examples, refraining from allocating CATR REs in one or more RBs of a slot that includes reserved REs may enable CATR RE locations to be consistent (e.g., identical) across one or more symbols within the slot.

Additionally, or alternatively, the contention rule 225 may include that the UE 215 (e.g., and the network entity 205) uses multiple (e.g., different) CATR REs locations across one or more symbols based on a type of downlink signaling allocated for the one or more symbols. For example, the contention rule 225 may include that the UE 215 and the network entity 205 use different CATR RE locations for symbols allocated for data signaling (e.g., data-only symbols) and for symbols allocated for both data and control signaling (e.g., for reserved RE multiplexed symbols). In such an example, the UE 215 and the network entity 205 may avoid contention between CATR REs and reserved REs for the symbols allocated for both data and control signaling (e.g., for the reserved RE multiplexed symbols. In other words, for the reserved RE multiplexed symbols, there may be no contention (e.g., collision) between CATR REs and reserved REs (e.g., DMRS tones). As described herein, for symbols allocated for data signaling may include symbols allocated to the PDSCH and symbols allocated for data and control signaling may include symbols allocated to the PDSCH and PDCCH (e.g., symbols in which PDSCH and PDCCH REs, such reserved REs, may be multiplexed). In other words, the contention rule 225 may include a first rule that pertains to contention resolution within symbols allocated to a first channel used for downlink control signaling and a second channel used for downlink data signaling (e.g., that pertains to contention resolution within reserved RE multiplexed symbols), and may also include a second rule that pertains to contention resolution within symbols allocated to (e.g., to only) the second channel used for downlink data signaling (e.g., that pertains to contention resolution within data-only symbols). In such an example, the first set of REs (e.g., the initial set of REs) may include a first subset of REs allocated for tone reservation signaling within one or more symbols allocated to the first channel and the second channel (e.g., may include one or more REs within reserved RE multiplexed symbols), and may include a second subset of REs allocated for tone reservation signaling within one or more symbols allocated to (e.g., to only) the second channel (e.g., may include one or more REs within data-only symbols). In some examples, a percentage of tones used for CATR may be the same for both types of symbols (e.g., data-only symbols and reserved RE multiplexed symbols). That is, the first subset of REs may include a first percentage of REs within the one or more symbols allocated to the first channel and the second channel and the second subset of REs may include a second percentage of REs within the one or more symbols allocated to (e.g., to only) the second channel. The first percentage may be the same as the second percentage.

In some examples, the network entity 205 may indicate different CATR RE locations (e.g., patterns) for the different symbol types to the UE 215. For example, the network entity 205 may transmit (e.g., via the second control message 230) a first CATR RE pattern for data symbols and transmit a second CATR RE pattern for reserved RE multiplexed symbols. In other words, the network entity 205 may indicate, to the UE 215, the first subset of REs and the second subset of REs. In some other examples, the second CATR RE pattern for reserved RE symbols may be derived from the first CATR RE pattern for data symbols. That is, the first rule may include that a respective location of REs allocated for tone reservation signaling within the symbols allocated to the first channel and the second channel may be based on a respective location of REs allocated for tone reservation signaling within the symbols allocated to (e.g., to only) the second channel. For example, the second CATR RE pattern may be derived according to a derivation rule (e.g., an algorithm), which may preserve a threshold distance (e.g., a minimum distance) from the CATR REs associated with the first CATR RE pattern (e.g., the data symbols CATR pattern) while avoiding contention of CATR REs and reserved REs. That is, the first rule may include that the respective location of REs allocated for tone reservation signaling within the symbols allocated to the first channel and the second channel may be based on a quantity (e.g., a minimum or otherwise suitable quantity) of REs between an RE allocated for tone reservation signaling within the symbols allocated to (e.g., to only) the second channel and an RE allocated for tone reservation signaling within the symbols allocated to the first channel and the second channel. In some examples, the contention rule 225 may include that the network entity 205 uses the same CATR REs (e.g., a same CARE pattern) for multiple (e.g., all) symbols. In such an example, CATR REs that contend with reserved REs may be punctured. That is, the contention rule 225 may include that REs in the first set of REs that overlap with one or more REs allocated to the channel used for downlink control signaling are punctured. In such examples, the network entity 205 may process (e.g., handle, manage, mitigate) an increase (e.g., an expected increase) in PAPR (e.g., via modulation and coding scheme (MCS) selection, via scheduling procedures) based on puncturing the CATR REs.

In some examples, the contention rule 225 may be based on a type of contention between the REs allocated for tone reservation signaling and the REs allocated to the channel used for downlink signaling. For example, the contention rule 225 may be specified based on a type of reserved RE (e.g., PDCCH REGs of a scheduling DCI, PRB-symbol bitmap REs, CORESET REs). In other words, the contention rule 225 may be specified per reserved RE type, such that multiple (e.g., different) rules may apply to multiple (e.g., different) reserved RE types. That is, the contention rule 225 may be different for different types of contending (e.g., overlapping) reserved REs. In some examples, the type of contention may include a first type of contention between the REs allocated for tone reservation signaling and REs allocated for downlink control signaling (e.g., PDCCH REGs of a scheduling DCI), a second type of contention between the REs allocated for tone reservation signaling and REs associated with a PRB-symbol bitmap (e.g., PRB-symbol bitmap REs), a third type of contention between the REs allocated for tone reservation signaling and REs allocated to a CORESET (e.g., CORESET REs), or a fourth type of contention between the REs allocated for tone reservation signaling and REs allocated for transmission of downlink reference signals. That is, the network entity 205 may use a first contention rule for CATR RE contention with PDCCH REGs of a scheduling DCI and may use a second contention rule for other types of reserved REs. In other words, the UE 215 and the network entity 205 may use one or more contention rules for contention with PDCCH REs associated with a scheduling DCI for the UE 215 and one or more other contention rules for other types of reserved REs (e.g., the one or more other types of reserved REs may be punctured by CATR tones). In such examples, the network entity 205 may compensate for the different types of contention (e.g., by increasing an aggregation level, by scheduling reserved REs based on the knowledge of the CATR tones locations).

In some examples, the network entity 205 may specify one or more sets of REs to the UE 215 for contention resolution. For example, the network entity 205 (e.g., a gNB) may specify two (or more) sets of REs in which a set of REs may include REs that the UE 215 may rate match around for PDSCH demodulation and another set of REs may include REs that CATR should avoid contention with (e.g., via the contention rule 225). In other words, the network entity 205 may indicate (e.g., specify, separately indicate) one or more REs for rate matching for downlink data signaling and one or more REs for tone reservation signaling. For example, the UE 215 may receive second control information that indicates a third set of REs used for rate matching associated with the channel used for downlink signaling (e.g., REs that the UE 215 may rate match around for PDSCH demodulation) and indicates a fourth set of REs used for rate matching associated with tone reservation signaling (e.g., REs that CATR should avoid contention with). In some examples, the fourth set of REs may be a subset of the third set of REs. That is, the PDSCH may be rate matched around a union of reserved RE types (e.g., the third set of REs) and CATR tones may be rate matched (e.g., moved to new locations, such as based on an algorithm) around (e.g., based on) a different set of REs (e.g., the fourth set of REs) which may be a subset of the third set of REs. In some examples, the UE 215 may be unaware of whether one or more DCIs are transmitted via a CORESET (e.g., whether the CORESET is filled with DCIs or not, whether one or more REs of the CORESET are reserved REs) and, therefore, the UE 215 may be unaware of a potential contention between the REs of the CORESET and CATR REs. In such examples, the network entity 205 may use such information to determine a different set of reserved REs (e.g., may use a different set of reserved REs) and improve (e.g., optimize) the CATR locations. In other words, the UE

215 may not be aware of whether a CORESET includes DCI messages or not, and may therefore be unaware of potential contention between CORESET REs and CATR REs. Thus, the network entity 205 may specify different sets of REs to increase efficiency for contention resolution at the UE 215 (e.g., using the contention rule 225).

The contention rule 225 specified for contention resolution between CATR REs and reserved REs may also be used in conjunction with one or more other contention rules, such as one or more contention rules for resolving contention resolution between CATR REs and reference signals (e.g., DMRSs). In some examples, the contention rule 225 may be a same rule as a contention rule for reference signal contention and may apply to reserved REs and reference signals. That is, the contention rule 225 may enable the network entity 205 and the UE 215 to handle contention with both reserved REs and reference signals. Alternatively, the contention rule 225 and the contention rule for reference signals may be different. For example, the UE 215 may determine the second set of REs based on application of the rule and a second rule that pertains to contention resolution between REs allocated for tone reservation signaling and REs allocated for transmission of downlink reference signals.

Figure 3:
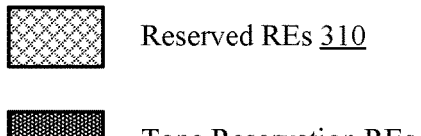
FIG. 3 shows an example of a resource element (RE) configuration that supports rules for resolving CATR contention in accordance with one or more aspects of the present disclosure.
Figure 3:
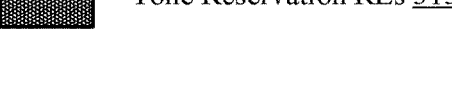
Figure 3:
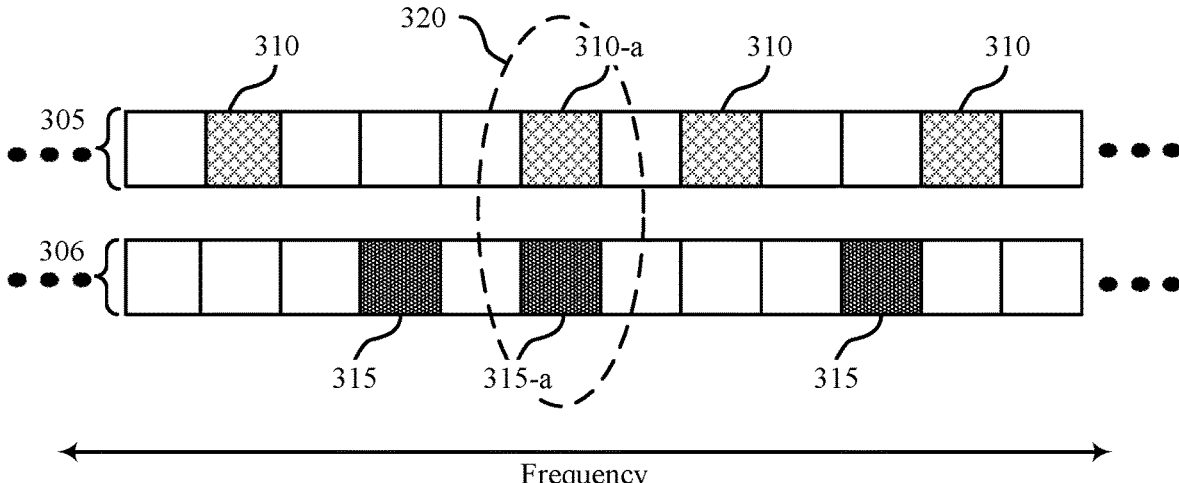

FIG. 3 shows an example of an RE configuration 300 that supports rules for resolving CATR contention in accordance with one or more aspects of the present disclosure. The RE configuration 300 illustrates an example of a first RE set 305 of a channel and a second RE set 306 of the channel. The first RE set 305 and the second RE set 306 may be aligned in frequency and include respective reserved RE patterns or tone reservation RE patterns (e.g., CATR REs). The first RE set 305 and the second RE set 306 may also include fewer or more REs than the REs shown (as indicated by the ellipses).

The first RE set 305 may include multiple reserved REs 310. The second RE set 306 may include multiple tone reservation REs 315. In some examples, one or more REs (e.g., one or more subcarriers and one or more OFDM symbols of the transmitted signal) used for tone reservations may be occupied with PAPR reduction signals, which may not include data, and which may not be known to a UE. That is, a tone reservation algorithm may not consider or may be insensitive to subcarrier locations used for the PAPR reduction. Additionally, in some examples, one or more of the same subcarriers (e.g., subcarriers used for PAPR reduction, subcarriers used for tone reservation signals) may have lower energy relative to data REs (e.g., relative to subcarriers used for data signals). In some examples of CATR, the selected REs used for conveying or transmitting the PAPR reduction signal (e.g., a tone reservation signal) may be selected dynamically based on a channel response, such that the selected REs may occupy a relatively low power RE (e.g., a lowest power RE), and such that the resulting capacity loss may be reduced (e.g., minimized). However, the selected RE (e.g., the subcarrier) for the tone reservation and for downlink control signaling (e.g., PDCCH REGs of a scheduling DCI, PRB-symbol bitmaps, CORESETs) may be the same. At the overlap 320, the tone reservation RE 315-*a* overlaps or collides with the reserved RE 310-*a*. To avoid channel estimation degradation that may be caused by a potential collision, one or more rules (e.g., a contention rule, such as a contention rule 225 illustrated by and described with reference to FIG. 2) may be used to resolve the contention, for example, before reserving the RE for the CATR, the downlink control signaling, or both.

Figure 4:
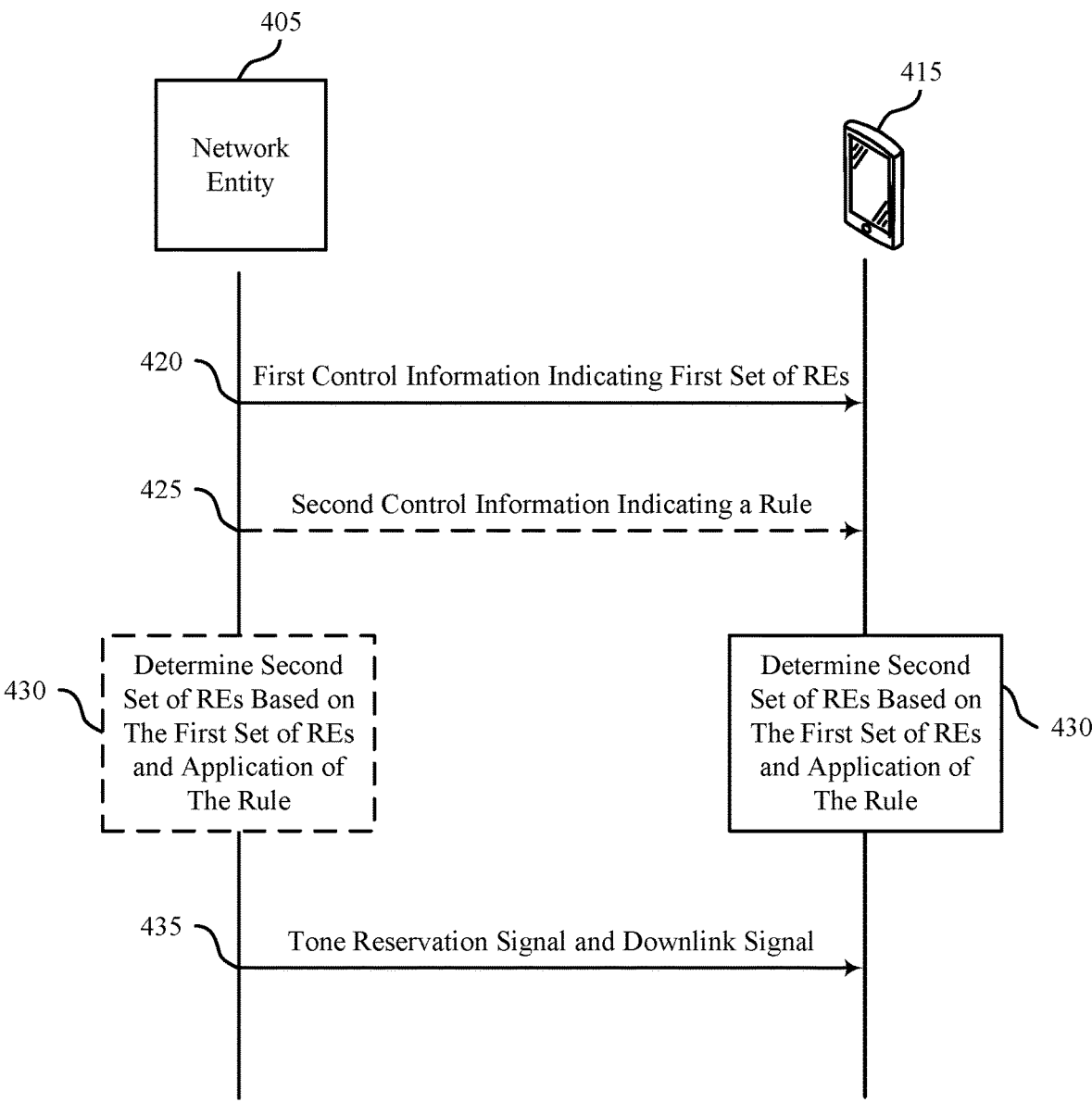
FIG. 4 shows an example of a process flow that supports rules for resolving CATR contention in accordance with one or more aspects of the present disclosure.

FIG. 4 shows an example of a process flow 400 that supports rules for resolving CATR contention in accordance with one or more aspects of the present disclosure. In some examples, process flow 400 may implement aspects of the wireless communications system 100 and the wireless communications system 200. For example, the process flow 400 may include a UE 415, which may be an example of a UE illustrated by and described with reference to FIGS. 1 and 2. The process flow 400 may also include a network entity 405, which may be an example of a network entity illustrated by and described with reference to FIGS. 1 and 2.

In the following description of the process flow 400, the operations performed by the network entity 405 and the UE 415 may be performed in different orders or at different times than the example order shown. Some operations may also be omitted from the process flow 400, or other operations may be added to the process flow 400. Further, while operations in the process flow 400 are illustrated as being performed by the network entity 405 and the UE 415, the examples herein are not to be construed as limiting, as the described features may be associated with any quantity of different devices. As used herein, RE or REs refers to one or more REs or a vector of REs (e.g., multiple REs). For example, an RE for a CATR may refer to a vector of multiple CATR REs. Similarly, an RE for a reference signal may refer to a vector of multiple reference signal REs. Accordingly, a contention between a CATR RE and a reference signal RE discussed herein may refer to a contention between multiple REs of respective vectors.

At 420, the UE 415 may receive (e.g., the network entity 405 may output or transmit) first control information that indicates a first set of REs (e.g., an initial set of CATR REs) allocated for a tone reservation signal (e.g., a CATR signal, a PAPR reduction signal). In some examples, the first set of REs may be based on a channel frequency response associated with wireless communication at the UE 415. For instance, the tone reservation signal may be located in relatively low energy REs (e.g., frequency ranges) of the channel frequency response (e.g., channel nulls).

In some examples, at 425, the UE 415 may receive second control information from the network entity 405 that indicates a rule. The rule may be an example of a contention rule illustrated by and described with reference to FIG. 2. For example, the rule may pertain to contention resolution between REs allocated for tone reservation signaling (e.g., CATR REs) and REs allocated to a channel used for downlink signaling (e.g., reserved REs). The UE 415 may determine (e.g., at 430) a second set of REs allocated for tone reservation signaling based on receiving the second control information. In some examples, the second control information received at 425 (or the first control information received at 420) may indicate a third set of REs used for rate matching associated with the channel used for downlink signaling and may indicate a fourth set of REs used for rate matching associated with tone reservation signaling. In some examples, the rule may include that the second set of REs is based on the third set of REs and the fourth set of REs, and the fourth set of REs may include a subset of the third set of REs. The second control information received at 425 may be received (and transmitted) via an RRC message, a MAC-CE, or a DCI message.

At 430, the UE 415 (e.g., and the network entity 405) may determine a second set of REs (e.g., a modified set of CATR REs) for the tone reservation signal based on the first set of REs and application of the rule (e.g., the rule signaled at 425). The second set of REs may be different than the first set of REs based on the application of the rule. The rule may pertain to contention resolution between REs allocated for tone reservation signaling (e.g., CATR REs) and REs allocated to a channel used for downlink signaling (e.g., reserved REs). In some examples, the rule may include that the second set of REs is non-overlapping with a resource block and a slot that includes at least one RE allocated to the channel used for downlink control signaling. That is, the network entity 405 may not allocate CATR REs on tones that are used for reserved REs in one or more symbols in a slot that includes at least one reserved RE.

Alternatively, the rule may include a first rule that pertains to contention resolution within symbols allocated to a first channel used for downlink control signaling and a second channel used for downlink data signaling (e.g., symbols multiplexed with reserved REs and data), and a second rule that pertains to contention resolution within symbols allocated to (e.g., to only) the second channel used for downlink data signaling (e.g., data only symbols). In some examples, the first set of REs may include a first subset of REs allocated for tone reservation signaling within one or more symbols allocated to the first channel and the second channel, and may include a second subset of REs allocated for tone reservation signaling within one or more symbols allocated to (e.g., to only) the second channel. The first subset of REs may include a first percentage of REs within the one or more symbols allocated to the first channel and the second channel, and the second subset of REs may include a second percentage of REs within the one or more symbols allocated to (e.g., to only) the second channel. In some examples, the first percentage may be a same percentage as the second percentage.

The first rule may include that a respective location of REs allocated for tone reservation signaling within the symbols allocated to the first channel and the second channel is based on a respective location of REs allocated for tone reservation signaling within the symbols allocated to (e.g., to only) the second channel. In some examples, the network entity 405 may indicate (e.g., via the second control information received at the UE 415 at 425) multiple (e.g., different, separate) RE allocation patterns for tone reservation signaling for multiple symbol types (e.g., each symbol type), or the network entity 405 may indicate a first RE allocation pattern (e.g., CATR RE locations for data only symbols) and the UE 415 may derive a second RE allocation pattern based on a derivation rule. For example, the first rule may include that the respective location of REs allocated for tone reservation signaling within the symbols allocated to the first channel and the second channel is based on a quantity (e.g., a minimum or otherwise suitable quantity) of REs between an RE allocated for tone reservation signaling within the symbols allocated to (e.g., to only) the second channel and an RE allocated for tone reservation signaling within the symbols allocated to the first channel and the second channel.

In some examples, the rule may include that REs in the first set of REs that overlap with one or more REs allocated to the channel used for downlink control signaling are punctured. The rule for contention resolution may be based on a type of contention between the REs allocated for tone reservation signaling and the REs allocated to the channel used for downlink signaling. The type of contention may include a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

In some examples, the network entity 405 and the UE 415 may determine the second set of REs based on application of the rule and a second rule that pertains to contention resolution between REs allocated for tone reservation signaling and REs allocated for transmission of downlink reference signals. In some examples, the rule may pertain to contention resolution between REs allocated for tone reservation signaling and reference signal REs (e.g., the rule may be a same rule for both types of contention).

In some examples, the REs allocated to the channel used for downlink signaling, referred to herein as reserved REs, may include REs within a PDCCH REG, REs indicated via a PRB-symbol bitmap, REs within a CORESET, or resources allocated for transmission of downlink reference signal, or any combination thereof.

At 435, the UE 415 may receive both the tone reservation signal and a downlink signal, in which the tone reservation signal is received in accordance with the second set of REs. In some examples, by receiving the tone reservation signal in accordance with the second set of REs, both the network entity 405 and the UE 415 may have resolved contention with CATR REs included in the first set of REs, thereby increases an efficiency with which the UE 415 may receive (e.g., and process) the combined tone reservation signal and the downlink signal (e.g., a PAPR reduced signal).

Figure 5:
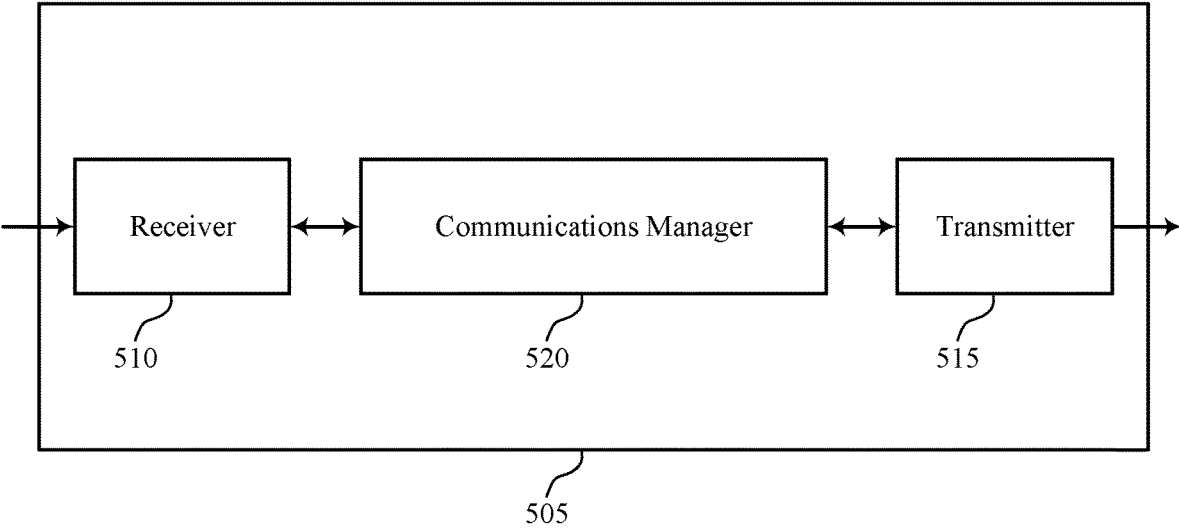
FIGS. 5 and 6 show block diagrams of devices that support rules for resolving CATR contention in accordance with one or more aspects of the present disclosure.

FIG. 5 shows a block diagram 500 of a device 505 that supports rules for resolving CATR contention in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to rules for resolving CATR contention). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to rules for resolving CATR contention). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of rules for resolving CATR contention as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving control information that indicates a first set of REs allocated for a tone reservation signal, where the first set of REs is based on a channel frequency response associated with wireless communication at the UE. The communications manager 520 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The communications manager 520 is capable of, configured to, or operable to support a means for receiving both the tone reservation signal and a downlink signal, where the tone reservation signal is received in accordance with the second set of REs.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources and improved data rates, among other benefits.

Figure 6:
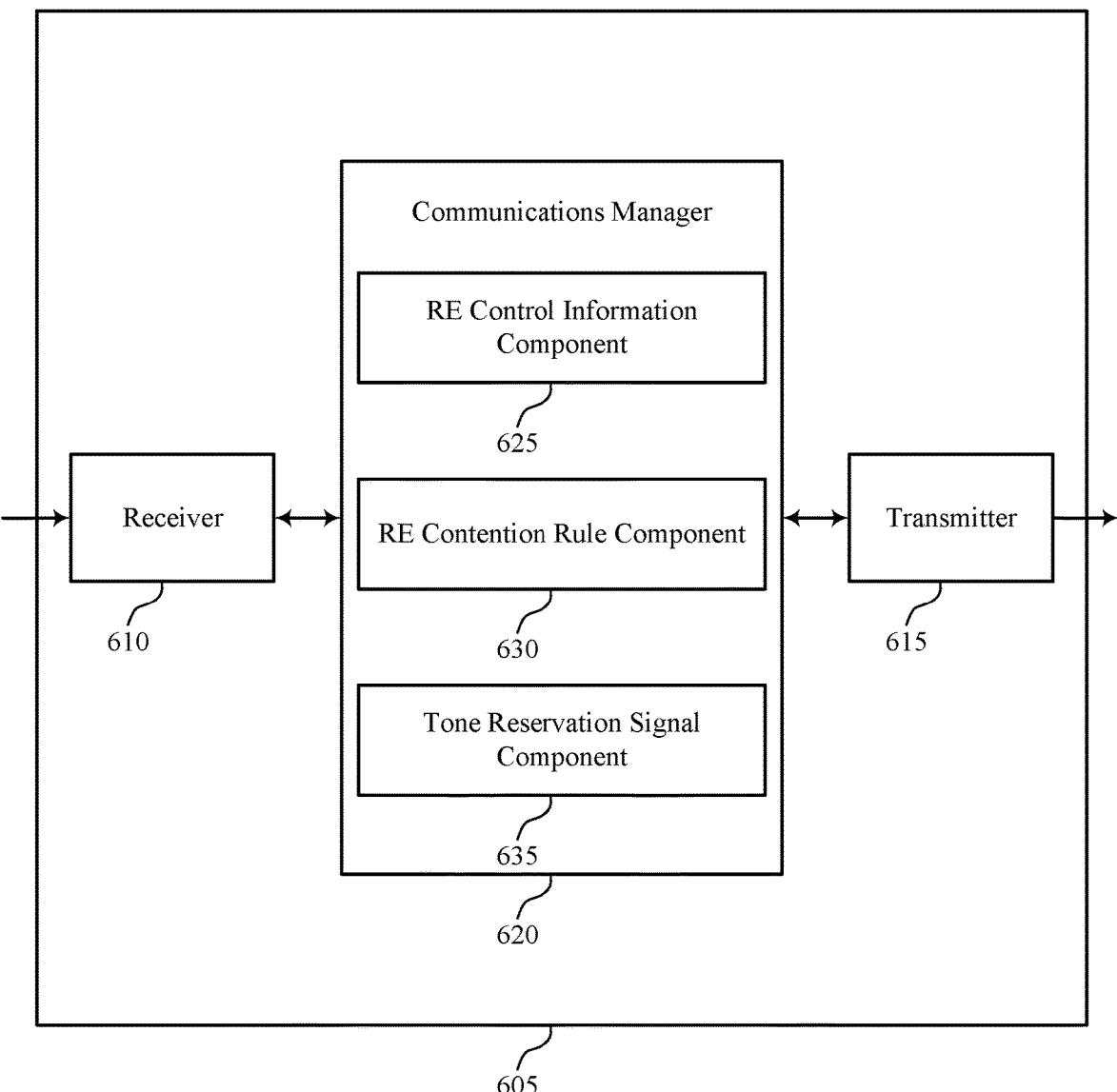

FIG. 6 shows a block diagram 600 of a device 605 that supports rules for resolving CATR contention in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to rules for resolving CATR contention). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to rules for resolving CATR contention). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of rules for resolving CATR contention as described herein. For example, the communications manager 620 may include an RE control information component 625, an RE contention rule component 630, a tone reservation signal component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The RE control information component 625 is capable of, configured to, or operable to support a means for receiving control information that indicates a first set of REs allocated for a tone reservation signal, where the first set of REs is based on a channel frequency response associated with wireless communication at the UE. The RE contention rule component 630 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The tone reservation signal component 635 is capable of, configured to, or operable to support a means for receiving both the tone reservation signal and a downlink signal, where the tone reservation signal is received in accordance with the second set of REs.

Figure 7:
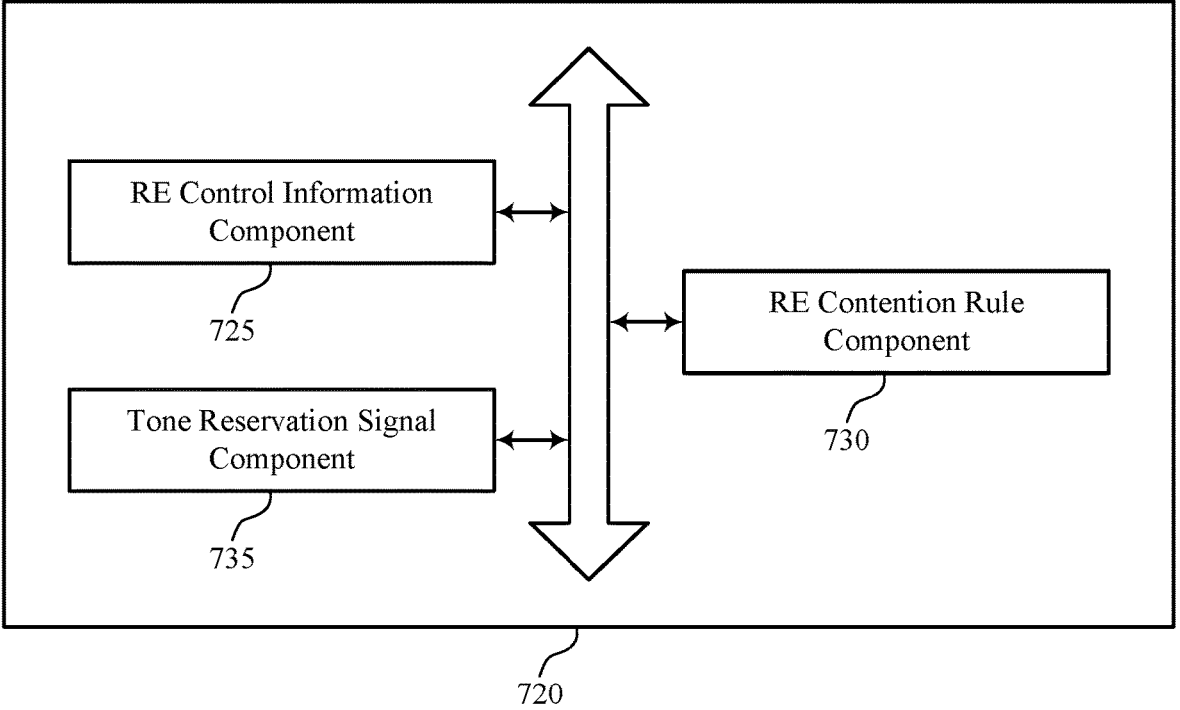
FIG. 7 shows a block diagram of a communications manager that supports rules for resolving CATR contention in accordance with one or more aspects of the present disclosure.

FIG. 7 shows a block diagram 700 of a communications manager 720 that supports rules for resolving CATR contention in accordance with one or more aspects of the present disclosure. The communications manager 720 may be an example of aspects of a communications manager 520, a communications manager 620, or both, as described herein. The communications manager 720, or various components thereof, may be an example of means for performing various aspects of rules for resolving CATR contention as described herein. For example, the communications manager 720 may include an RE control information component 725, an RE contention rule component 730, a tone reservation signal component 735, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The RE control information component 725 is capable of, configured to, or operable to support a means for receiving control information that indicates a first set of REs allocated for a tone reservation signal, where the first set of REs is based on a channel frequency response associated with wireless communication at the UE. The RE contention rule component 730 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The tone reservation signal component 735 is capable of, configured to, or operable to support a means for receiving both the tone reservation signal and a downlink signal, where the tone reservation signal is received in accordance with the second set of REs.

In some examples, the rule includes that the second set of REs is non-overlapping with a resource block and a slot that includes at least one RE allocated to the channel used for downlink control signaling. In some examples, the rule includes a first rule that pertains to contention resolution within symbols allocated to a first channel used for downlink control signaling and a second channel used for downlink data signaling, and includes a second rule that pertains to contention resolution within symbols allocated to only the second channel used for downlink data signaling. In some examples, the first set of REs includes a first subset of REs allocated for tone reservation signaling within one or more symbols allocated to the first channel and the second channel, and includes a second subset of REs allocated for tone reservation signaling within one or more symbols allocated to only the second channel.

In some examples, the first subset of REs include a first percentage of REs within the one or more symbols allocated to the first channel and the second channel. In some examples, the second subset of REs include a second percentage of REs within the one or more symbols allocated to only the second channel. In some examples, the first percentage is the same as the second percentage. In some examples, the first rule includes that a respective location of REs allocated for tone reservation signaling within the symbols allocated to the first channel and the second channel is based on a respective location of REs allocated for tone reservation signaling within the symbols allocated to only the second channel.

In some examples, the first rule further includes that the respective location of REs allocated for tone reservation signaling within the symbols allocated to the first channel and the second channel is based on a minimum (or otherwise suitable) quantity of REs between an RE allocated for tone reservation signaling within the symbols allocated to only the second channel and an RE allocated for tone reservation signaling within the symbols allocated to the first channel and the second channel. In some examples, the rule includes that REs in the first set of REs that overlap with one or more REs allocated to the channel used for downlink control signaling are punctured.

In some examples, the rule for contention resolution is based on a type of contention between the REs allocated for tone reservation signaling and the REs allocated to the channel used for downlink signaling. In some examples, the type of contention includes a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

In some examples, the RE control information component 725 is capable of, configured to, or operable to support a means for receiving second control information that indicates a third set of REs used for rate matching associated with the channel used for downlink signaling and indicates a fourth set of REs used for rate matching associated with tone reservation signaling, where the rule includes that the second set of REs is based on the third set of REs and the fourth set of REs. In some examples, the fourth set of REs includes a subset of the third set of REs.

In some examples, the RE control information component 725 is capable of, configured to, or operable to support a means for receiving second control information that indicates the rule, where determining the second set of REs is based on receiving the second control information. In some examples, to support receiving the second control information, the RE control information component 725 is capable of, configured to, or operable to support a means for receiving an RRC message, a MAC_CE, or DCI including the second control information.

In some examples, to support determining the second set of REs, the RE contention rule component 730 is capable of, configured to, or operable to support a means for determining the second set of REs based on application of the rule and a second rule that pertains to contention resolution between REs allocated for tone reservation signaling and REs allocated for transmission of downlink reference signals. In some examples, the rule pertains to contention resolution between REs allocated for tone reservation signaling and reference signal REs. In some examples, the REs allocated to the channel used for downlink signaling include REs within a PDCCH REG, REs indicated via a PRB-symbol bitmap, REs within a CORESET, or resources allocated for transmission of downlink reference signal, or any combination thereof. In some examples, the second set of REs is different than the first set of REs based on the application of the rule.

Figure 8:
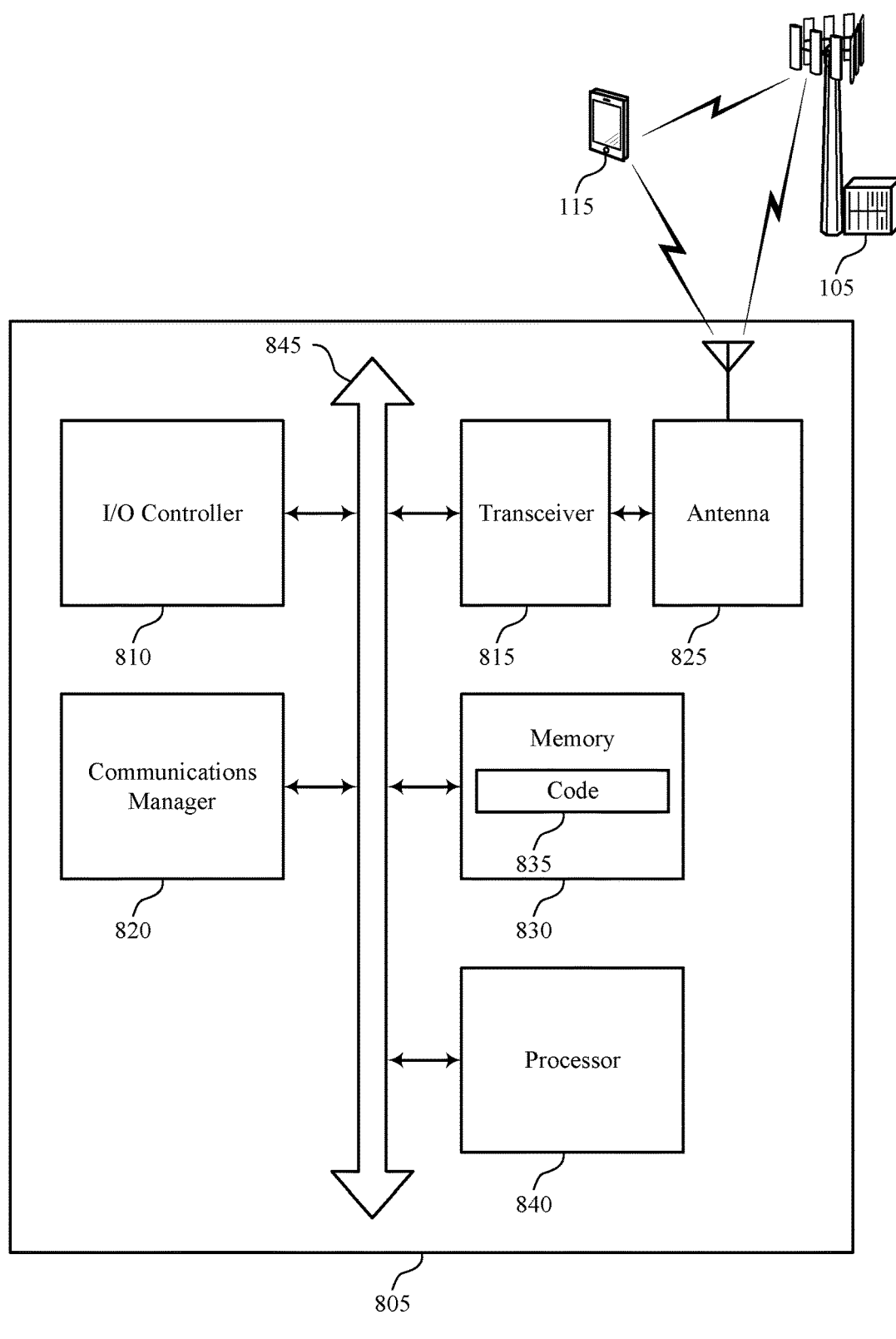
FIG. 8 shows a diagram of a system including a device that supports rules for resolving CATR contention in accordance with one or more aspects of the present disclosure.

FIG. 8 shows a diagram of a system 800 including a device 805 that supports rules for resolving CATR contention in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting rules for resolving CATR contention). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for receiving control information that indicates a first set of REs allocated for a tone reservation signal, where the first set of REs is based on a channel frequency response associated with wireless communication at the UE. The communications manager 820 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The communications manager 820 is capable of, configured to, or operable to support a means for receiving both the tone reservation signal and a downlink signal, where the tone reservation signal is received in accordance with the second set of REs.

By including or configuring the communications manager 820 in accordance with examples as described herein, the device 805 may support techniques for improved communication reliability, improved user experience related to increased spectral efficiency, reduced power consumption, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of rules for resolving CATR contention as described herein, or the at least one processor 840 and the at least one memory 830 may be otherwise configured to, individually or collectively, perform or support such operations.

Figure 9:
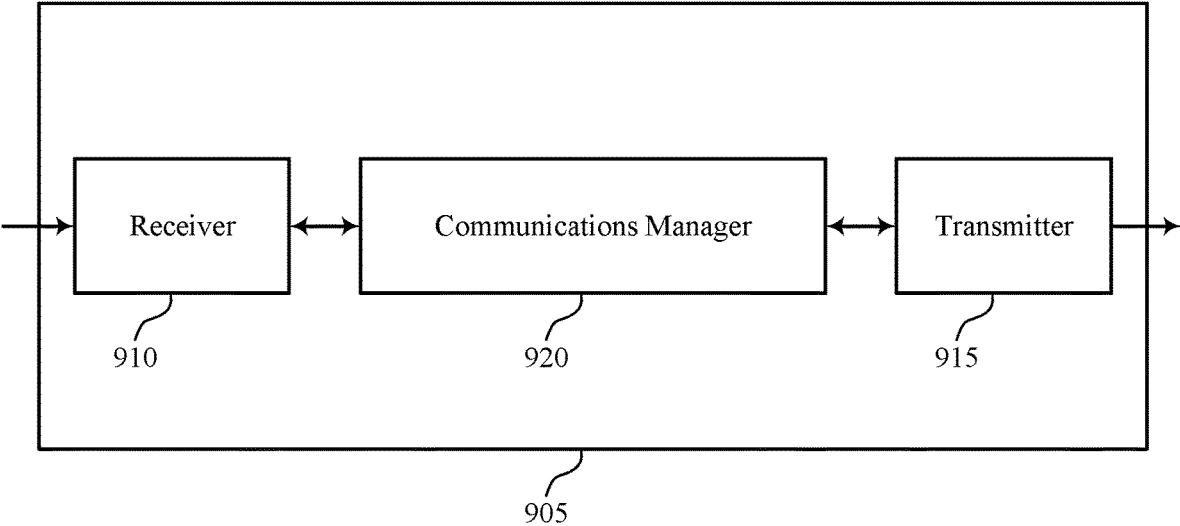
FIGS. 9 and 10 show block diagrams of devices that support rules for resolving CATR contention in accordance with one or more aspects of the present disclosure.

FIG. 9 shows a block diagram 900 of a device 905 that supports rules for resolving CATR contention in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of rules for resolving CATR contention as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting control information that indicating a first set of REs allocated for a tone reservation signal, where the first set of REs is based on a channel frequency response associated with wireless communication at the network entity. The communications manager 920 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The communications manager 920 is capable of, configured to, or operable to support a means for outputting both the tone reservation signal and a downlink signal, where the tone reservation signal is transmitted in accordance with the second set of REs.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources and improved data rates, among other benefits.

Figure 10:
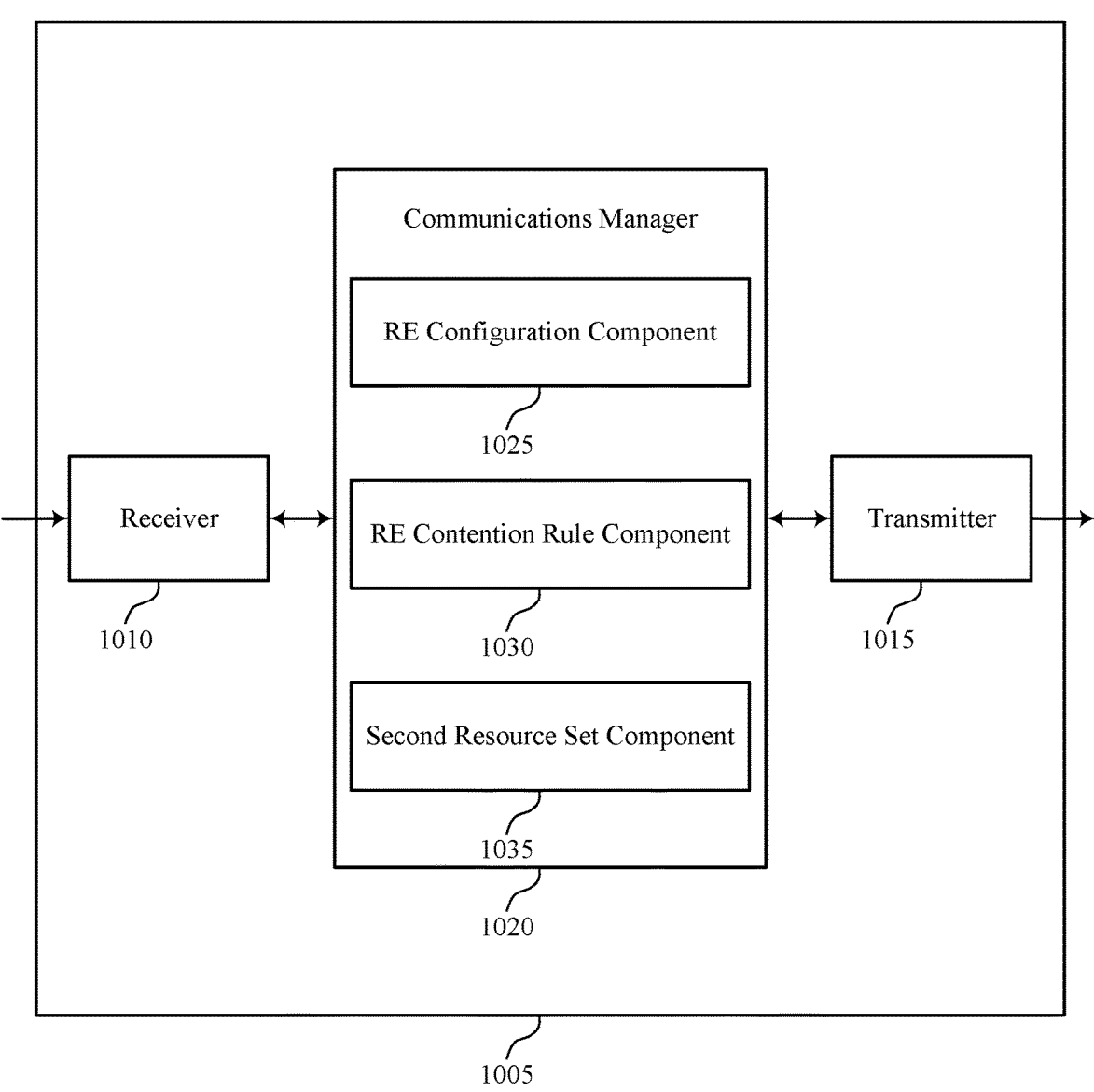

FIG. 10 shows a block diagram 1000 of a device 1005 that supports rules for resolving CATR contention in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of rules for resolving CATR contention as described herein. For example, the communications manager 1020 may include an RE configuration component 1025, an RE contention rule component 1030, a second resource set component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The RE configuration component 1025 is capable of, configured to, or operable to support a means for outputting control information that indicates a first set of REs allocated for a tone reservation signal, where the first set of REs is based on a channel frequency response associated with wireless communication at the network entity. The RE contention rule component 1030 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The second resource set component 1035 is capable of, configured to, or operable to support a means for outputting both the tone reservation signal and a downlink signal, where the tone reservation signal is transmitted in accordance with the second set of REs.

Figure 11:
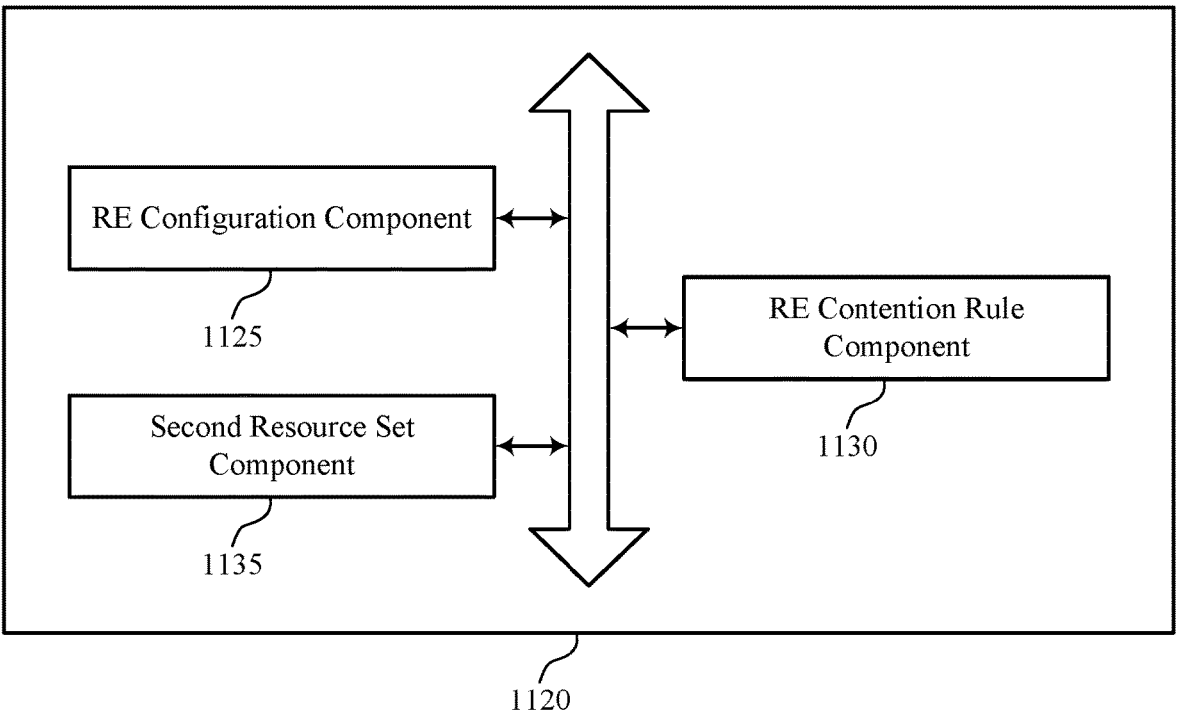
FIG. 11 shows a block diagram of a communications manager that supports rules for resolving CATR contention in accordance with one or more aspects of the present disclosure.

FIG. 11 shows a block diagram 1100 of a communications manager 1120 that supports rules for resolving CATR contention in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of rules for resolving CATR contention as described herein. For example, the communications manager 1120 may include an RE configuration component 1125, an RE contention rule component 1130, a second resource set component 1135, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The RE configuration component 1125 is capable of, configured to, or operable to support a means for outputting control information that indicates a first set of REs allocated for a tone reservation signal, where the first set of REs is based on a channel frequency response associated with wireless communication at the network entity. The RE contention rule component 1130 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The second resource set component 1135 is capable of, configured to, or operable to support a means for outputting both the tone reservation signal and a downlink signal, where the tone reservation signal is transmitted in accordance with the second set of REs.

In some examples, the rule includes that the second set of REs is non-overlapping with a resource block and a slot that include at least one RE allocated to the channel used for downlink control signaling. In some examples, the rule includes a first rule that pertains to contention resolution within symbols allocated to a first channel used for downlink control signaling and a second channel used for downlink data signaling, and includes a second rule that pertains to contention resolution within symbols allocated to only the second channel used for downlink data signaling.

In some examples, the first set of REs includes a first subset of REs allocated for tone reservation signaling within one or more symbols allocated to the first channel and the second channel, and includes a second subset of REs allocated for tone reservation signaling within one or more symbols allocated to only the second channel. In some examples, the first subset of REs include a first percentage of REs within the one or more symbols allocated to the first channel and the second channel. In some examples, the second subset of REs include a second percentage of REs within the one or more symbols allocated to only the second channel. In some examples, the first percentage is the same as the second percentage.

In some examples, the first rule includes that a respective location of REs allocated for tone reservation signaling within the symbols allocated to the first channel and the second channel is based on a respective location of REs allocated for tone reservation signaling within the symbols allocated to only the second channel. In some examples, the first rule further includes that the respective location of REs allocated for tone reservation signaling within the symbols allocated to the first channel and the second channel is based on a minimum (or otherwise suitable) quantity of REs between an RE allocated for tone reservation signaling within the symbols allocated to only the second channel and an RE allocated for tone reservation signaling within the symbols allocated to the first channel and the second channel.

In some examples, the rule includes that REs in the first set of REs that overlap with one or more REs allocated to the channel used for downlink control signaling are punctured. In some examples, the rule for contention resolution is based on a type of contention between the REs allocated for tone reservation signaling and the REs allocated to the channel used for downlink signaling. In some examples, the type of contention includes a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

In some examples, the RE configuration component 1125 is capable of, configured to, or operable to support a means for outputting second control information that indicates a third set of REs used for rate matching associated with the channel used for downlink signaling and indicates a fourth set of REs used for rate matching associated with tone reservation signaling, where the rule includes that the second set of REs is based on the third set of REs and the fourth set of REs. In some examples, the fourth set of REs includes a subset of the third set of REs.

In some examples, the RE configuration component 1125 is capable of, configured to, or operable to support a means for outputting second control information that indicates the rule. In some examples, to support outputting the second control information, the RE configuration component 1125 is capable of, configured to, or operable to support a means for outputting an RRC message, a MAC-CE, or DCI including the second control information.

In some examples, to support determining the second set of REs, the RE contention rule component 1130 is capable of, configured to, or operable to support a means for determining the second set of REs based on application of the rule and a second rule that pertains to contention resolution between REs allocated for tone reservation signaling and REs allocated for transmission of downlink reference signals. In some examples, the rule pertains to contention resolution between REs allocated for tone reservation signaling and reference signal REs. In some examples, the REs allocated to the channel used for downlink signaling include REs within a PDCCH REG, REs indicated via a PRB-symbol bitmap, REs within a CORESET, or resources allocated for transmission of downlink reference signal, or any combination thereof. In some examples, the second set of REs is different than the first set of REs based on the application of the rule.

Figure 12:
FIG. 12 shows a diagram of a system including a device that supports rules for resolving CATR contention in accordance with one or more aspects of the present disclosure.

FIG. 12 shows a diagram of a system 1200 including a device 1205 that supports rules for resolving CATR contention in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting rules for resolving CATR contention). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting control information that indicating a first set of REs allocated for a tone reservation signal, where the first set of REs is based on a channel frequency response associated with wireless communication at the network entity. The communications manager 1220 is capable of, configured to, or operable to support a means for determining a second set of REs for the tone reservation signal based on the first set of REs and application of a rule, where the rule pertains to contention resolution between REs allocated for tone reservation signaling and REs allocated to a channel used for downlink signaling. The communications manager 1220 is capable of, configured to, or operable to support a means for outputting both the tone reservation signal and a downlink signal, where the tone reservation signal is transmitted in accordance with the second set of REs.

By including or configuring the communications manager 1220 in accordance with examples as described herein, the device 1205 may support techniques for improved communication reliability, improved user experience related to increased spectral efficiency, reduced power consumption, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of rules for resolving CATR contention as described herein, or the at least one processor 1235 and the at least one memory 1225 may be otherwise configured to, individually or collectively, perform or support such operations.

FIG. 13 shows a flowchart illustrating a method 1300 that supports rules for resolving CATR contention in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control information that indicates a first set of REs allocated for a tone reservation signal, where the first set of REs is based on a channel frequency response associated with wireless communication at the UE. The operations of block 1305 may be performed in accordance with examples as disclosed herein. In some examples, aspects of the operations of 1305 may be performed by an RE control information component 725 as described with reference to FIG. 7.

At 1310, the method may include determining a second set of REs for the tone reservation signal based on the first set of REs and application of a rule, where the rule pertains to contention resolution between REs allocated for tone reservation signaling and REs allocated to a channel used for downlink signaling. The operations of block 1310 may be performed in accordance with examples as disclosed herein. In some examples, aspects of the operations of 1310 may be performed by an RE contention rule component 730 as described with reference to FIG. 7.

At 1315, the method may include receiving both the tone reservation signal and a downlink signal, where the tone reservation signal is received in accordance with the second set of REs. The operations of block 1315 may be performed in accordance with examples as disclosed herein. In some examples, aspects of the operations of 1315 may be performed by a tone reservation signal component 735 as described with reference to FIG. 7.

FIG. 14 shows a flowchart illustrating a method 1400 that supports rules for resolving CATR contention in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control information that indicates a first set of REs allocated for a tone reservation signal, where the first set of REs is based on a channel frequency response associated with wireless communication at the UE. The operations of block 1405 may be performed in accordance with examples as disclosed herein. In some examples, aspects of the operations of 1405 may be performed by an RE control information component 725 as described with reference to FIG. 7.

At 1410, the method may include receiving second control information that indicates the rule, where determining a second set of REs is based on receiving the second control information. The operations of block 1410 may be performed in accordance with examples as disclosed herein. In some examples, aspects of the operations of 1410 may be performed by an RE control information component 725 as described with reference to FIG. 7.

At 1415, the method may include determining the second set of REs for the tone reservation signal based on the first set of REs and application of the rule, where the rule pertains to contention resolution between REs allocated for tone reservation signaling and REs allocated to a channel used for downlink signaling. The operations of block 1415 may be performed in accordance with examples as disclosed herein. In some examples, aspects of the operations of 1415 may be performed by an RE contention rule component 730 as described with reference to FIG. 7.

At 1420, the method may include receiving both the tone reservation signal and a downlink signal, where the tone reservation signal is received in accordance with the second set of REs. The operations of block 1420 may be performed in accordance with examples as disclosed herein. In some examples, aspects of the operations of 1420 may be performed by a tone reservation signal component 735 as described with reference to FIG. 7.

FIG. 15 shows a flowchart illustrating a method 1500 that supports rules for resolving CATR contention in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include outputting control information that indicates a first set of REs allocated for a tone reservation signal, where the first set of REs is based on a channel frequency response associated with wireless communication at the network entity. The operations of block 1505 may be performed in accordance with examples as disclosed herein. In some examples, aspects of the operations of 1505 may be performed by an RE configuration component 1125 as described with reference to FIG. 11.

At 1510, the method may include determining a second set of REs for the tone reservation signal based on the first set of REs and application of a rule, where the rule pertains to contention resolution between REs allocated for tone reservation signaling and REs allocated to a channel used for downlink signaling. The operations of block 1510 may be performed in accordance with examples as disclosed herein. In some examples, aspects of the operations of 1510 may be performed by an RE contention rule component 1130 as described with reference to FIG. 11.

At 1515, the method may include outputting both the tone reservation signal and a downlink signal, where the tone reservation signal is transmitted in accordance with the second set of REs. The operations of block 1515 may be performed in accordance with examples as disclosed herein. In some examples, aspects of the operations of 1515 may be performed by a second resource set component 1135 as described with reference to FIG. 11.

FIG. 16 shows a flowchart illustrating a method 1600 that supports rules for resolving CATR contention in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting control information that indicates a first set of REs allocated for a tone reservation signal, where the first set of REs is based on a channel frequency response associated with wireless communication at the network entity. The operations of block 1605 may be performed in accordance with examples as disclosed herein. In some examples, aspects of the operations of 1605 may be performed by an RE configuration component 1125 as described with reference to FIG. 11.

At 1610, the method may include outputting second control information that indicates the rule. The operations of block 1610 may be performed in accordance with examples as disclosed herein. In some examples, aspects of the operations of 1610 may be performed by an RE configuration component 1125 as described with reference to FIG. 11.

At 1615, the method may include determining a second set of REs for the tone reservation signal based on the first set of REs and application of the rule, where the rule pertains to contention resolution between REs allocated for tone reservation signaling and REs allocated to a channel used for downlink signaling. The operations of block 1615 may be performed in accordance with examples as disclosed herein. In some examples, aspects of the operations of 1615 may be performed by an RE contention rule component 1130 as described with reference to FIG. 11.

At 1620, the method may include outputting both the tone reservation signal and a downlink signal, where the tone reservation signal is transmitted in accordance with the second set of REs. The operations of block 1620 may be performed in accordance with examples as disclosed herein. In some examples, aspects of the operations of 1620 may be performed by a second resource set component 1135 as described with reference to FIG. 11.

The following provides an overview of aspects of the present disclosure:

Aspect 1: A method for wireless communication by a UE, comprising: receiving control information that indicates a first set of REs allocated for a tone reservation signal, wherein the first set of REs is based at least in part on a channel frequency response associated with wireless communication at the UE; determining a second set of REs for the tone reservation signal based at least in part on the first set of REs and application of a rule, wherein the rule pertains to contention resolution between REs allocated for tone reservation signaling and REs allocated to a channel used for downlink signaling; and receiving both the tone reservation signal and a downlink signal, wherein the tone reservation signal is received in accordance with the second set of REs.

Aspect 2: The method of aspect 1, wherein the rule includes that the second set of REs is non-overlapping with an RB and a slot that includes at least one RE allocated to the channel used for downlink control signaling.

Aspect 3: The method of aspect 1, wherein the rule comprises a first rule that pertains to contention resolution within symbols allocated to a first channel used for downlink control signaling and a second channel used for downlink data signaling, and comprises a second rule that pertains to contention resolution within symbols allocated to only the second channel used for downlink data signaling.

Aspect 4: The method of aspect 3, wherein the first set of REs comprises a first subset of REs allocated for tone reservation signaling within one or more symbols allocated to the first channel and the second channel, and comprises a second subset of REs allocated for tone reservation signaling within one or more symbols allocated to only the second channel.

Aspect 5: The method of aspect 4, wherein the first subset of REs comprise a first percentage of REs within the one or more symbols allocated to the first channel and the second channel, the second subset of REs comprise a second percentage of REs within the one or more symbols allocated to only the second channel, and the first percentage is the same as the second percentage.

Aspect 6: The method of any of aspects 3 through 5, wherein the first rule includes that a respective location of REs allocated for tone reservation signaling within the symbols allocated to the first channel and the second channel is based at least in part on a respective location of REs allocated for tone reservation signaling within the symbols allocated to only the second channel.

Aspect 7: The method of aspect 6, wherein the first rule further includes that the respective location of REs allocated for tone reservation signaling within the symbols allocated to the first channel and the second channel is based at least in part on a minimum quantity of REs between a RE allocated for tone reservation signaling within the symbols allocated to only the second channel and a RE allocated for tone reservation signaling within the symbols allocated to the first channel and the second channel.

Aspect 8: The method of aspect 1, wherein the rule includes that REs in the first set of REs that overlap with one or more REs allocated to the channel used for downlink control signaling are punctured.

Aspect 9: The method of any of aspects 1 through 8, wherein the rule for contention resolution is based at least in part on a type of contention between the REs allocated for tone reservation signaling and the REs allocated to the channel used for downlink signaling.

Aspect 10: The method of aspect 9, wherein the type of contention includes a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

Aspect 11: The method of any of aspects 1 through 10, further comprising: receiving second control information that indicates a third set of REs used for rate matching associated with the channel used for downlink signaling and indicates a fourth set of REs used for rate matching associated with tone reservation signaling, wherein the rule includes that the second set of REs is based at least in part on the third set of REs and the fourth set of REs.

Aspect 12: The method of aspect 11, wherein the fourth set of REs comprises a subset of the third set of REs.

Aspect 13: The method of any of aspects 1 through 12, further comprising: receiving second control information that indicates the rule, wherein determining the second set of REs is based at least in part on receiving the second control information.

Aspect 14: The method of aspect 13, wherein receiving the second control information comprises: receiving an RRC message, a MAC-CE, or DCI comprising the second control information.

Aspect 15: The method of any of aspects 1 through 14, wherein determining the second set of REs comprises: determining the second set of REs based at least in part on application of the rule and a second rule that pertains to contention resolution between REs allocated for tone reservation signaling and REs allocated for transmission of downlink reference signals.

Aspect 16: The method of any of aspects 1 through 14, wherein the rule pertains to contention resolution between REs allocated for tone reservation signaling and reference signal REs.

Aspect 17: The method of any of aspects 1 through 16, wherein the REs allocated to the channel used for downlink signaling include REs within a PDCCH REG, REs indicated via a PRB-symbol bitmap, REs within a CORESET, or resources allocated for transmission of downlink reference signal, or any combination thereof.

Aspect 18: The method of any of aspects 1 through 17, wherein the second set of REs is different than the first set of REs based at least in part on the application of the rule.

Aspect 19: A method for wireless communication by a network entity, comprising: outputting control information that indicates a first set of REs allocated for a tone reservation signal, wherein the first set of REs is based at least in part on a channel frequency response associated with wireless communication at the network entity; determining a second set of REs for the tone reservation signal based at least in part on the first set of REs and application of a rule, wherein the rule pertains to contention resolution between REs allocated for tone reservation signaling and REs allocated to a channel used for downlink signaling; and outputting both the tone reservation signal and a downlink signal, wherein the tone reservation signal is transmitted in accordance with the second set of REs.

Aspect 20: The method of aspect 19, wherein the rule includes that the second set of REs is non-overlapping with an RB and a slot that include at least one RE allocated to the channel used for downlink control signaling.

Aspect 21: The method of aspect 19, wherein the rule comprises a first rule that pertains to contention resolution within symbols allocated to a first channel used for downlink control signaling and a second channel used for downlink data signaling, and comprises a second rule that pertains to contention resolution within symbols allocated to only the second channel used for downlink data signaling.

Aspect 22: The method of aspect 21, wherein the first set of REs comprises a first subset of REs allocated for tone reservation signaling within one or more symbols allocated to the first channel and the second channel, and comprises a second subset of REs allocated for tone reservation signaling within one or more symbols allocated to only the second channel.

Aspect 23: The method of aspect 22, wherein the first subset of REs comprise a first percentage of REs within the one or more symbols allocated to the first channel and the second channel, the second subset of REs comprise a second percentage of REs within the one or more symbols allocated to only the second channel, and the first percentage is the same as the second percentage.

Aspect 24: The method of any of aspects 21 through 23, wherein the first rule includes that a respective location of REs allocated for tone reservation signaling within the symbols allocated to the first channel and the second channel is based at least in part on a respective location of REs allocated for tone reservation signaling within the symbols allocated to only the second channel.

Aspect 25: The method of aspect 24, wherein the first rule further includes that the respective location of REs allocated for tone reservation signaling within the symbols allocated to the first channel and the second channel is based at least in part on a minimum quantity of REs between a RE allocated for tone reservation signaling within the symbols allocated to only the second channel and a RE allocated for tone reservation signaling within the symbols allocated to the first channel and the second channel.

Aspect 26: The method of aspect 19, wherein the rule includes that REs in the first set of REs that overlap with one or more REs allocated to the channel used for downlink control signaling are punctured.

Aspect 27: The method of any of aspects 19 through 26, wherein the rule for contention resolution is based at least in part on a type of contention between the REs allocated for tone reservation signaling and the REs allocated to the channel used for downlink signaling.

Aspect 28: The method of aspect 27, wherein the type of contention includes a first type of contention between the REs allocated for tone reservation signaling and REs allocated for downlink control signaling, a second type of contention between the REs allocated for tone reservation signaling and REs associated with a PRB-symbol bitmap, a third type of contention between the REs allocated for tone reservation signaling and REs allocated to a CORESET, or a fourth type of contention between the REs allocated for tone reservation signaling and REs allocated for transmission of downlink reference signals.

Aspect 29: The method of any of aspects 19 through 28, further comprising:
outputting second control information that indicates a third set of REs used for rate matching associated with the channel used for downlink signaling and indicates a fourth set of REs used for rate matching associated with tone reservation signaling, wherein the rule includes that the second set of REs is based at least in part on the third set of REs and the fourth set of REs.

Aspect 30: The method of aspect 29, wherein the fourth set of REs comprises a subset of the third set of REs.

Aspect 31: The method of any of aspects 19 through 30, further comprising: outputting second control information that indicates the rule.

Aspect 32: The method of aspect 31, wherein outputting the second control information comprises: outputting an RRC message, a MAC-CE, or DCI comprising the second control information.

Aspect 33: The method of any of aspects 19 through 32, wherein determining the second set of REs comprises: determining the second set of REs based at least in part on application of the rule and a second rule that pertains to contention resolution between REs allocated for tone reservation signaling and REs allocated for transmission of downlink reference signals.

Aspect 34: The method of any of aspects 19 through 32, wherein the rule pertains to contention resolution between REs allocated for tone reservation signaling and reference signal REs.

Aspect 35: The method of any of aspects 19 through 34, wherein the REs allocated to the channel used for downlink signaling include REs within a PDCCH REG, REs indicated via a PRB-symbol bitmap, REs within a CORESET, or resources allocated for transmission of downlink reference signal, or any combination thereof.

Aspect 36: The method of any of aspects 19 through 35, wherein the second set of REs is different than the first set of REs based at least in part on the application of the rule.

Aspect 37: A UE for wireless communication, comprising one or more memories storing processor-executable code, and one or more processors coupled with the one or more memories and individually or collectively operable to execute the code to cause the UE to perform a method of any of aspects 1 through 18.

Aspect 38: A UE for wireless communication, comprising at least one means for performing a method of any of aspects 1 through 18.

Aspect 39: A non-transitory computer-readable medium storing code for wireless communication, the code comprising instructions executable by one or more processors to perform a method of any of aspects 1 through 18.

Aspect 40: A network entity for wireless communication, comprising one or more memories storing processor-executable code, and one or more processors coupled with the one or more memories and individually or collectively operable to execute the code to cause the network entity to perform a method of any of aspects 19 through 36.

Aspect 41: A network entity for wireless communication, comprising at least one means for performing a method of any of aspects 19 through 36.

Aspect 42: A non-transitory computer-readable medium storing code for wireless communications, the code comprising instructions executable by one or more processors to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive control information that indicates a first set of resource elements allocated for a tone reservation signal, wherein the first set of resource elements is based at least in part on a channel frequency response associated with wireless communication at the UE;
determine a second set of resource elements for the tone reservation signal based at least in part on the first set of resource elements and application of a rule, wherein the rule pertains to contention resolution between resource elements allocated for tone reservation signaling and resource elements allocated to a channel used for downlink signaling; and
receive both the tone reservation signal and a downlink signal, wherein the tone reservation signal is received in accordance with the second set of resource elements.

2. The UE of claim 1, wherein the rule includes that the second set of resource elements is non-overlapping with a resource block and a slot that includes at least one resource element allocated to the channel used for downlink control signaling.

3. The UE of claim 1, wherein the rule comprises a first rule that pertains to contention resolution within symbols allocated to a first channel used for downlink control signaling and a second channel used for downlink data signaling, and comprises a second rule that pertains to contention resolution within symbols allocated to only the second channel used for downlink data signaling.

4. The UE of claim 3, wherein the first set of resource elements comprises a first subset of resource elements allocated for tone reservation signaling within one or more symbols allocated to the first channel and the second channel, and comprises a second subset of resource elements allocated for tone reservation signaling within one or more symbols allocated to only the second channel.

5. The UE of claim 4, wherein the first subset of resource elements comprise a first percentage of resource elements within the one or more symbols allocated to the first channel and the second channel, wherein the second subset of resource elements comprise a second percentage of resource elements within the one or more symbols allocated to only the second channel, and wherein the first percentage is the same as the second percentage.

6. The UE of claim 3, wherein the first rule includes that a respective location of resource elements allocated for tone reservation signaling within the symbols allocated to the first channel and the second channel is based at least in part on a respective location of resource elements allocated for tone reservation signaling within the symbols allocated to only the second channel.

7. The UE of claim 6, wherein the first rule further includes that the respective location of resource elements allocated for tone reservation signaling within the symbols allocated to the first channel and the second channel is based at least in part on a minimum quantity of resource elements between a resource element allocated for tone reservation signaling within the symbols allocated to only the second channel and a resource element allocated for tone reservation signaling within the symbols allocated to the first channel and the second channel.

8. The UE of claim 1, wherein the rule includes that resource elements in the first set of resource elements that overlap with one or more resource elements allocated to the channel used for downlink control signaling are punctured.

9. The UE of claim 1, wherein the rule for contention resolution is based at least in part on a type of contention between the resource elements allocated for tone reservation signaling and the resource elements allocated to the channel used for downlink signaling.

10. The UE of claim 9, wherein the type of contention includes a first type of contention between the resource elements allocated for tone reservation signaling and resource elements allocated for downlink control signaling, a second type of contention between the resource elements allocated for tone reservation signaling and resource elements associated with a physical resource block-symbol bitmap, a third type of contention between the resource elements allocated for tone reservation signaling and resource elements allocated to a control resource set, or a fourth type of contention between the resource elements allocated for tone reservation signaling and resource elements allocated for transmission of downlink reference signals.

11. The UE of claim 1, wherein the one or more processors are individually or collectively further operable to execute the code to cause the UE to:
receive second control information that indicates a third set of resource elements used for rate matching associated with the channel used for downlink signaling and indicates a fourth set of resource elements used for rate matching associated with tone reservation signaling, wherein the rule includes that the second set of resource elements is based at least in part on the third set of resource elements and the fourth set of resource elements.

12. The UE of claim 11, wherein the fourth set of resource elements comprises a subset of the third set of resource elements.

13. The UE of claim 1, wherein the one or more processors are individually or collectively further operable to execute the code to cause the UE to:
receive second control information that indicates the rule, wherein determining the second set of resource elements is based at least in part on receiving the second control information.

14. The UE of claim 1, wherein, to determine the second set of resource elements, the one or more processors are individually or collectively operable to execute the code to cause the UE to:
determine the second set of resource elements based at least in part on application of the rule and a second rule that pertains to contention resolution between resource elements allocated for tone reservation signaling and resource elements allocated for transmission of downlink reference signals.

15. The UE of claim 1, wherein the rule pertains to contention resolution between resource elements allocated for tone reservation signaling and reference signal resource elements.

16. The UE of claim 1, wherein the resource elements allocated to the channel used for downlink signaling include resource elements within a physical downlink control channel resource element group, resource elements indicated via a physical resource block-symbol bitmap, resource elements within a control resource set, or resources allocated for transmission of downlink reference signal, or any combination thereof.

17. The UE of claim 1, wherein the second set of resource elements is different than the first set of resource elements based at least in part on the application of the rule.

18. A network entity, comprising:
one or more memories storing processor-executable code; and
one or more processors coupled with the one or more memories and individually or collectively operable to execute the code to cause the network entity to:
output control information that indicates a first set of resource elements allocated for a tone reservation signal, wherein the first set of resource elements is based at least in part on a channel frequency response associated with wireless communication at the network entity;
determine a second set of resource elements for the tone reservation signal based at least in part on the first set of resource elements and application of a rule, wherein the rule pertains to contention resolution between resource elements allocated for tone reservation signaling and resource elements allocated to a channel used for downlink signaling;
output both the tone reservation signal and a downlink signal, wherein the tone reservation signal is transmitted in accordance with the second set of resource elements; and
output second control information that indicates the rule.

19. The network entity of claim 18, wherein the rule includes that the second set of resource elements is non-overlapping with a resource block and a slot that include at least one resource element allocated to the channel used for downlink signaling.

20. The network entity of claim 18, wherein the rule comprises a first rule that pertains to contention resolution within symbols allocated to a first channel used for downlink control signaling and a second channel used for downlink data signaling, and comprises a second rule that pertains to contention resolution within symbols allocated to only the second channel used for downlink data signaling.

21. The network entity of claim 20, wherein the first set of resource elements comprises a first subset of resource elements allocated for tone reservation signaling within one or more symbols allocated to the first channel and the second channel, and comprises a second subset of resource elements allocated for tone reservation signaling within one or more symbols allocated to only the second channel.

22. The network entity of claim 21, wherein the first subset of resource elements comprise a first percentage of resource elements within the one or more symbols allocated to the first channel and the second channel, wherein the second subset of resource elements comprise a second percentage of resource elements within the one or more symbols allocated to only the second channel, and wherein the first percentage is the same as the second percentage.

23. The network entity of claim 20, wherein the first rule includes that a respective location of resource elements allocated for tone reservation signaling within the symbols allocated to the first channel and the second channel is based at least in part on a respective location of resource elements allocated for tone reservation signaling within the symbols allocated to only the second channel.

24. The network entity of claim 18, wherein the rule includes that resource elements in the first set of resource elements that overlap with one or more resource elements allocated to the channel used for downlink signaling are punctured.

25. The network entity of claim 18, wherein the rule for contention resolution is based at least in part on a type of contention between the resource elements allocated for tone reservation signaling and the resource elements allocated to the channel used for downlink signaling.

26. The network entity of claim 25, wherein the type of contention includes a first type of contention between the resource elements allocated for tone reservation signaling and resource elements allocated for downlink control signaling, a second type of contention between the resource elements allocated for tone reservation signaling and resource elements associated with a physical resource block-symbol bitmap, a third type of contention between the resource elements allocated for tone reservation signaling and resource elements allocated to a control resource set, or a fourth type of contention between the resource elements allocated for tone reservation signaling and resource elements allocated for transmission of downlink reference signals.

27. The network entity of claim 18, wherein the one or more processors are individually or collectively further operable to execute the code to cause the network entity to:

output second control information that indicates a third set of resource elements used for rate matching associated with the channel used for downlink signaling and indicates a fourth set of resource elements used for rate matching associated with tone reservation signaling, wherein the rule includes that the second set of resource elements is based at least in part on the third set of resource elements and the fourth set of resource elements.

28. A method for wireless communication by a user equipment (UE), comprising:

receiving control information that indicates a first set of resource elements allocated for a tone reservation signal, wherein the first set of resource elements is based at least in part on a channel frequency response associated with wireless communication at the UE;

determining a second set of resource elements for the tone reservation signal based at least in part on the first set of resource elements and application of a rule, wherein the rule pertains to contention resolution between resource elements allocated for tone reservation signaling and resource elements allocated to a channel used for downlink signaling; and receiving both the tone reservation signal and a downlink signal, wherein the tone reservation signal is received in accordance with the second set of resource elements.

29. A method for wireless communication by a network entity, comprising:

outputting control information that indicates a first set of resource elements allocated for a tone reservation signal, wherein the first set of resource elements is based at least in part on a channel frequency response associated with wireless communication at the network entity;

determining a second set of resource elements for the tone reservation signal based at least in part on the first set of resource elements and application of a rule, wherein the rule pertains to contention resolution between resource elements allocated for tone reservation signaling and resource elements allocated to a channel used for downlink signaling;

outputting both the tone reservation signal and a downlink signal, wherein the tone reservation signal is transmitted in accordance with the second set of resource elements; and outputting second control information that indicates the rule.

* * * * *